United States Patent [19]
Takatsu et al.

[11] Patent Number: 6,009,076
[45] Date of Patent: *Dec. 28, 1999

[54] REPEATING INSTALLATION

[75] Inventors: Kazuo Takatsu; Katsuichi Ohara; Kanta Yamamoto, all of Kawasaki; Yoshinori Nakamura, Osaka; Toshihito Echizenya, Tokyo, all of Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/593,567

[22] Filed: Jan. 30, 1996

[30] Foreign Application Priority Data

Jun. 15, 1995 [JP] Japan ................................. 7-148777

[51] Int. Cl.⁶ ............................................ H04J 1/16
[52] U.S. Cl. ........................................................ 370/227
[58] Field of Search ................................... 370/211, 217, 370/218, 219, 220, 221, 225, 227, 228, 535–544, 503, 509, 510, 241, 226, 351, 352, 248, 251, 256, 407, 425, 424, 423, 222; 395/181; 340/827, 825.01; 379/221; 359/177, 174

[56] References Cited

U.S. PATENT DOCUMENTS

| | | | |
|---|---|---|---|
| 5,130,837 | 7/1992 | Kitamura et al. | 359/174 |
| 5,179,548 | 1/1993 | Sandesara | 370/222 |
| 5,216,666 | 6/1993 | Stalick | 370/222 |
| 5,274,496 | 12/1993 | Fujiwara et al. | 359/177 |
| 5,479,396 | 12/1995 | Kusano | 370/217 |
| 5,515,360 | 5/1996 | Hesse | 370/217 |
| 5,533,006 | 7/1996 | Uchida | 370/222 |

*Primary Examiner*—Dang Ton
*Attorney, Agent, or Firm*—Helfgott & Karas, PC

[57] ABSTRACT

A communications system has two transmission circuits, each transmitting a multiplexed signal in both ways. A repeating installation used therein selects either one of the two transmission circuits and terminates management information contained in a signal which flows through a transmission circuit selected by the selecting unit. The repeating installation sets the other non-selected transmission circuit to be in a high impedance state. The selection and termination are commonly performed for the two transmission circuits, and the repeating installation further extracts the management information transmitted and outputs the management information to be outputted. The management information includes a section overhead having management information concerning a repeating section of the communications system, and the repeating installation does not terminate management information concerning a multiplex section. One of the two transmission circuits includes a spare transmission circuit.

13 Claims, 32 Drawing Sheets

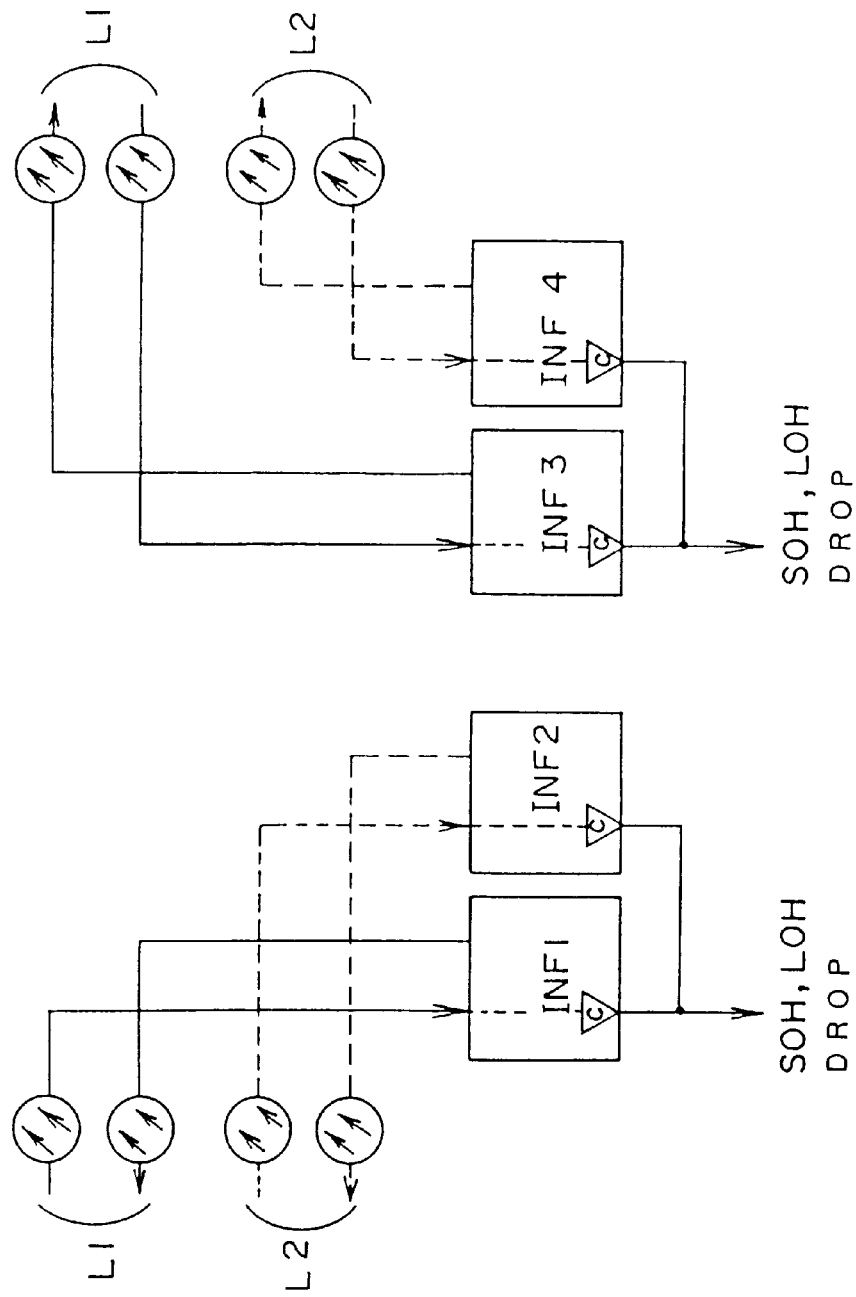

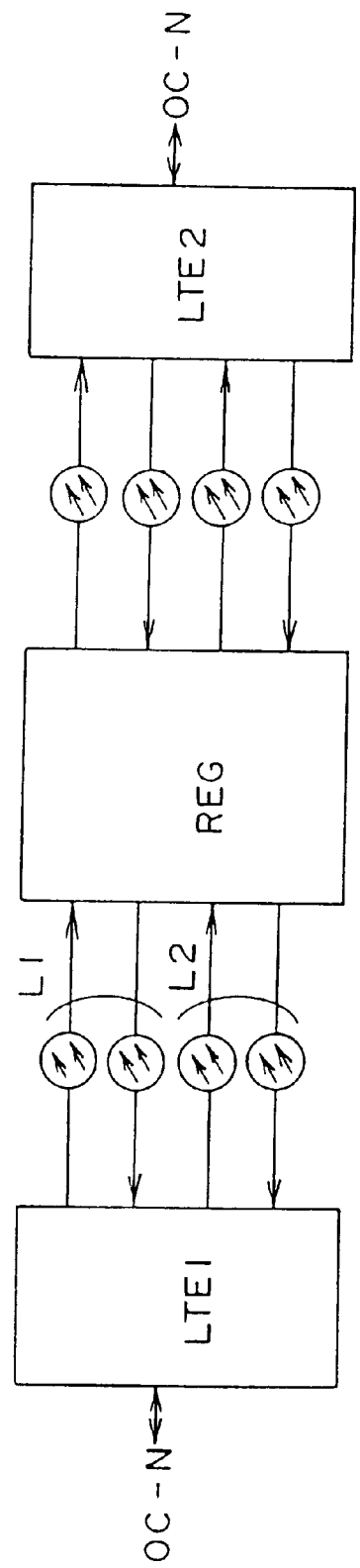

FIG. 15

|  | SYMBOL | USE |
|---|---|---|
| SOH | A 1, A 2 | FRAME SYNCHRONIZATION |
|  | C 1 | IDENTIFICATION NUMBER OF EACH STM-1 IN STM-N |
|  | B 1 | ERROR MONITORING OF REPEATING SECTION |
|  | E 1 | VOICE ORDER OF REPEATING SECTION |
|  | F 1 | TROUBLE SPECIFICATION OF REPEATING SECTION |
|  | D 1 − D 3 | DATA COMMUNICATIONS OF REPEATING SECTION |
| LOH | B 2 | ERROR MONITORING OF SECTION |
|  | K 1 | CONTROL OF SWITCHING CIRCUIT |
|  | K 2 | TRANSFER OF MULTIPLEX SECTION STATE |
|  | D 4 − D 1 2 | DATA COMMUNICATIONS OF MULTIPLEX SECTION |
|  | Z 1 | MULTIPLEX SPARE |
|  | Z 2 | REPORTING OF MULTIPLEX ERROR STATE |
|  | B 2 | VOICE ORDER OF MULTIPLEX SECTION |

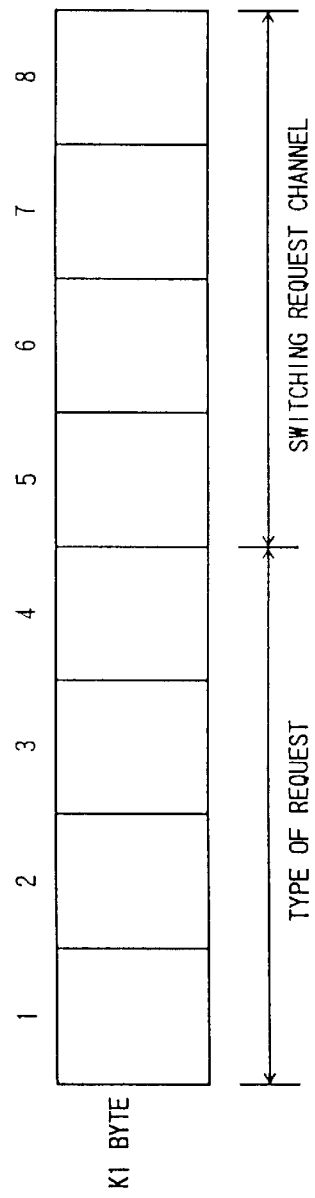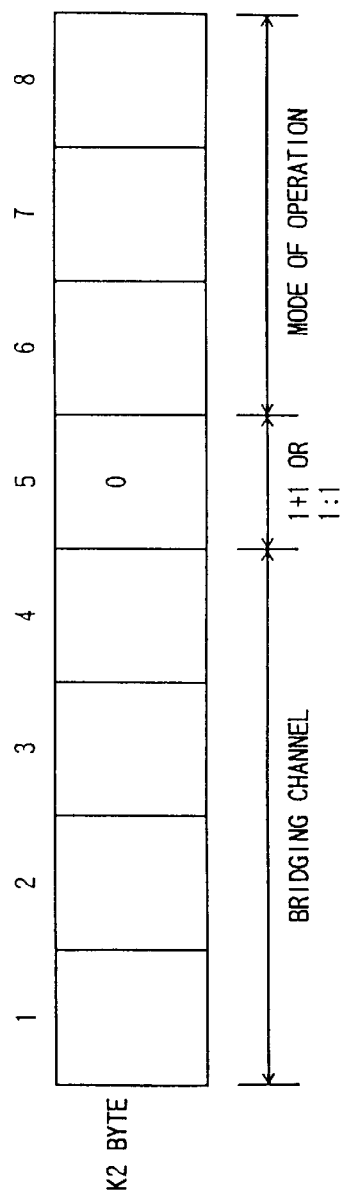

F I G. 2 1
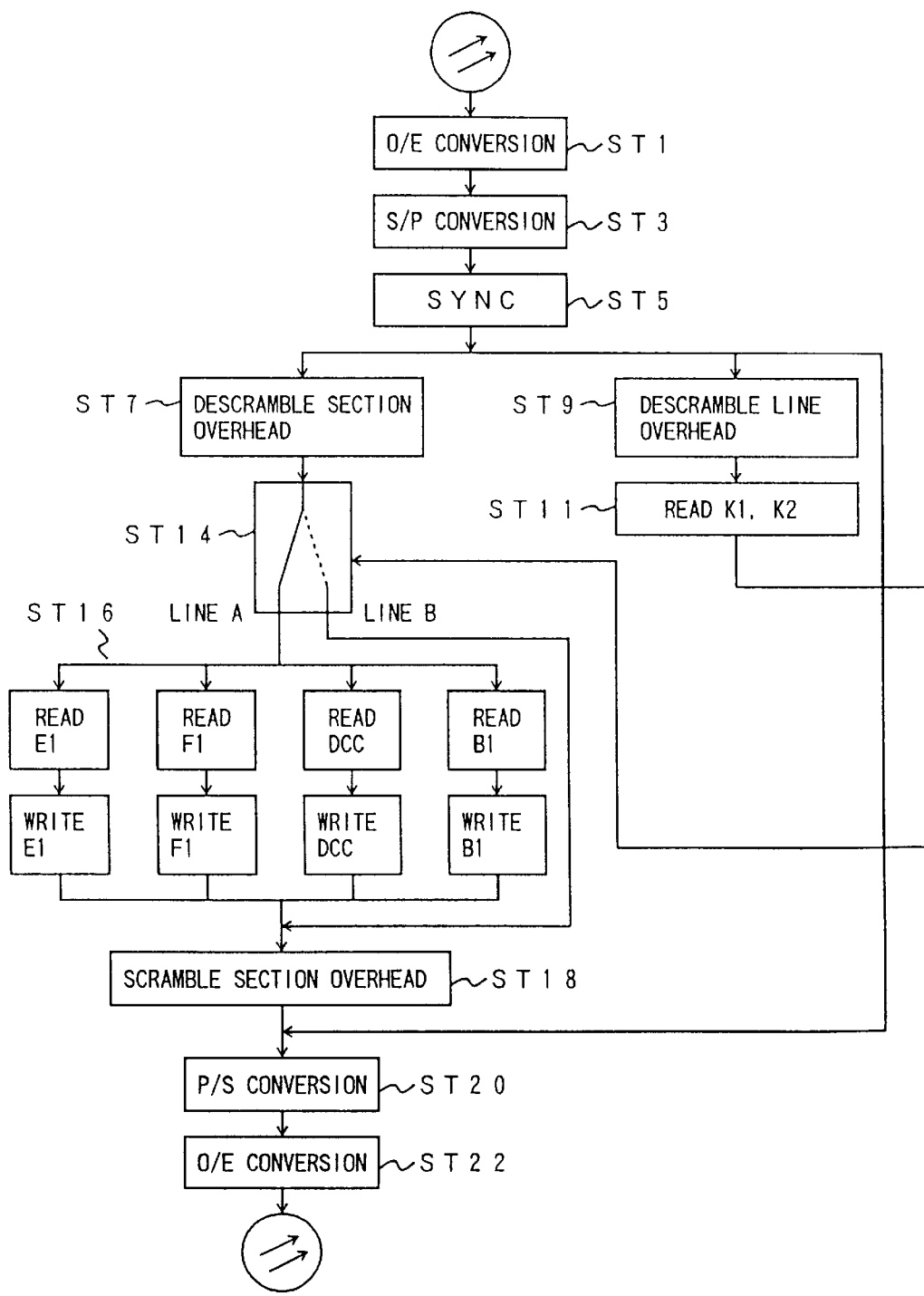

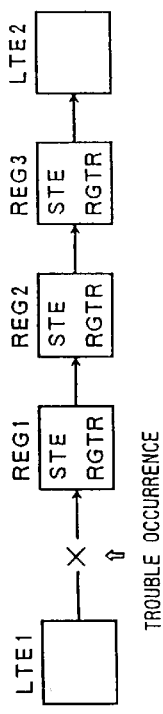
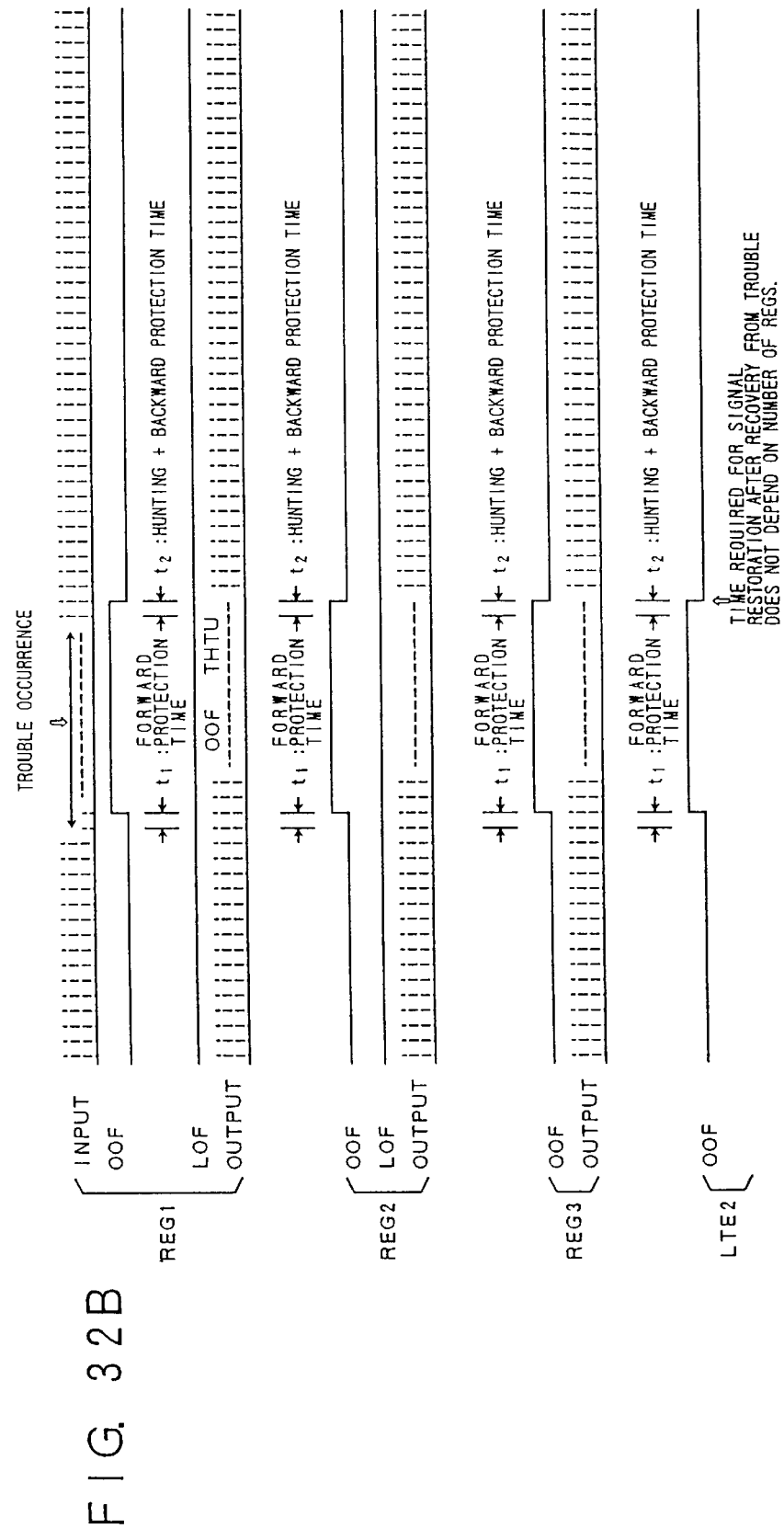

6,009,076

1

REPEATING INSTALLATION

BACKGROUND OF THE INVENTION

1. Field of the Invention

The present invention relates to an optical communications network, and in particular to a repeating installation used in a synchronous optical communications network.

Recently, as a hierarchy providing a wideband service, an SDH (Synchronous Digital Hierarchy) has been internationally standardized. A SONET (Synchronous Optical NETwork), which is used in a North America, is one example of such a hierarchy.

2. Description of the Related Art

FIG. 1 shows a block diagram of an example of a SONET transmission system. A repeating installation, ADM (Add/Drop Multiplexer) is provided between two apparatuses which comprise line terminated equipment (LTE) LTE1 and LTE2 which face each other in a point-to-point network arrangement. Each of the line terminated equipment LTE1 and LTE2 forms a higher-order group optical interface (input and output interface) for a multiplexed optical signal OC-N ('OC' being an abbreviation of Optical Container and 'N' being an arbitrary number). For example, OC-12 has a transmission rate of 622.08 Mbps. The line terminated equipment LTE1 and LTE2 are connected with each other, via the repeating installation ADM, using two both-way optical transmission circuits L1 and L2. Either circuit (optical fibers) of the two optical transmission circuits L1 and L2 is used as a currently used circuit and the other one is used as a spare circuit. The repeating installation ADM has functions of extraction and insertion of a service signal (terminating function), in addition to functions of regenerative repeating, extraction and insertion for a main signal (terminating function). The service signal contains various monitoring and control information and is used for maintaining and monitoring a telephone line, for maintenance persons to communicate with each other, and SONET transmission system. Such a service signal is transmitted in use of a section overhead SOH or a line overhead LOH contained in a transmission signal.

In a SONET, the section overhead SOH is used for managing a repeating section between repeating installations, and the line overhead LOH is used for managing a multiplex section between line terminated equipment. As will be described later, the section overhead SOH has an arrangement of 3 rows by 9 columns and the line overhead LOH has an arrangement of 5 rows by 9 columns. The section overhead SOH and line overhead LOH are added at the top of a multiplexed digital signal. A path overhead for managing a path between multiplexing apparatuses is also used for maintenance and monitoring.

FIG. 2 shows a block diagram of part of the above-mentioned repeating installation ADM. Interfaces INF1 and INF2 are provided for the transmission circuits L1 and L2 from the line terminated equipment LTE1, respectively. Interfaces INF3 and INF4 are provided for the transmission circuits L1 and L2 from the line terminated equipment LTE2, respectively. In FIG. 2, circuits for extracting overheads SOH and LOH (service signal) in the interfaces IF1, IF2, IF3 and IF4 are indicated, and circuits for inserting the overheads SOH and LOH are omitted. Outputs of the interfaces INF1 and INF2 are integrated through a high impedance control unit C, and similarly outputs of the interfaces INF3 and INF4 are integrated through a high impedance control unit C. The high impedance control unit C of either one of the interfaces INF1 and INF2 is set to be

2 at a high impedance, and the high impedance control unit C of either one of the interfaces INF3 and INF4 is set to be at a high impedance. Accordingly, the overheads SOH and LOH outputted by either one of the interfaces INF1 and INF2 are extracted, and the overheads SOH and LOH outputted by either one of the interfaces INF3 and INF4 are extracted. Because the same signal is transmitted in the currently used circuit and spare circuit, it is enough that the overheads SOH and LOH of the signal is transmitted via either one of the two circuits.

As a repeating installation similar to the above-described repeating installation ADM, there is a regenerator (REG). As shown in FIG. 3, the regenerator REG, similar to the repeating installation ADM, is provided between the line terminated equipment LTE1 and LTE2. Further, the regenerator REG may be provided between the repeating installations ADM. Different from the repeating installation ADM, the regenerator REG does not have the functions of extracting and inserting a main signal and line overhead LOH.

FIG. 4 shows a block diagram of part of the above-described regenerator REG. As shown in the figure, interfaces INF11 through INF14 are provided for respective lines of two transmission circuits. Different from the repeating installation ADM, the regenerator REG does not necessarily perform repeating on both the currently used circuit and the spare circuit. For example, shown in FIG. 5, the regenerator REG performs repeating on either one of the currently used circuit and the spare circuit between the line terminated equipment LTE1 and LTE2, and on either one of the currently used circuit and the spare circuit between the line terminated equipment LTE3 and LTE4, Accordingly, different from an arrangement shown in FIG. 2, the regenerator REG does not have the high impedance control unit C. Specifically, as shown in FIG. 4, the section overheads are extracted from all of the four lines of the two transmission circuits. Further, as described above, the regenerator REG does not extract and cause the line overheads to pass therethrough.

FIG. 6 shows a block diagram of part of a regenerator REG in the related art. The regenerator REG shown in the figure has higher-order group interface units 10, which are provided for the four lines of the two transmission circuits, and overhead processing mechanism 12 which has overhead processing units 12a, 12b, 12c and 12d. Section overheads SOH extracted in the higher-order group interface units 10 are sent to and terminated in the overhead processing units 12a, 12b, 12c and 12d, respectively. Main signals indicated by bold lines in FIG. 6 pass through the higher-order interface units 10 (it being regenerative repeating and the main signals not being terminated there.)

However, in the regenerator in the related art shown in FIG. 6, the overhead processing units 12a through 12d are provided for the respective lines of the transmission circuits and thus prevent the installation from being miniaturized, decreasing power consumption and decreasing cost.

SUMMARY OF THE INVENTION

An object of the present invention is to provide a miniaturized, low-power consuming and low-cost repeating installation having regenerator functions.

Another object of the present invention is to provide a repeating installation having functions of a regenerator and which can be provided as a result of performing a modification on a repeating installation ADM.

These objects are achieved by the present invention having arrangements which will now be described.

A repeating installation, according to the present invention, in a communications system having two transmission circuits, each transmitting a multiplexed signal in both ways, comprises:

selecting means for selecting either one of the two transmission circuits; and terminating means for terminating management information contained in a signal which flows through a transmission circuit selected by the selecting means.

Thereby, in comparison to a repeating system in the related art in which means for terminating the management information is provided for each transmission circuit, it is possible to make the repeating installation miniaturized, consume less power and cost less.

The repeating installation according to the present invention may further comprise setting means for setting the other non-selected transmission circuit to be in a high impedance state.

The selecting means and terminating means may be provided commonly for the two transmission circuits; and the repeating installation may further comprise extracting and outputting means for extracting the management information transmitted and outputting the management information to be outputted.

The management information may comprise a section overhead including management information concerning a repeating section of the communications system.

The management information may comprise a section overhead including management information concerning a repeating section of the communications system; and the terminating means may not terminate management information concerning a multiplex section.

One of the two transmission circuits may comprise a spare transmission circuit.

The selecting means may comprise means which refers to predetermined information contained in a signal flowing through the selected transmission circuit and selects either one of the two transmission circuits.

The repeating installation may further comprise means which terminates management information for managing a multiplex section of the communications system and obtains the predetermined information.

The predetermined information contained in the management information may comprise information indicating that the transmission circuit is switched over from a currently used transmission circuit to a spare transmission circuit due to occurrence of trouble.

Anther repeating installation, according to the present invention, in a communications system having at last one transmission circuits which transmits a multiplexed signal both ways, comprises:

determining means for determining whether or not management information contained in a signal which flows through the transmission system and concerning a repeating section of the communications system is terminated; and terminating means for terminating management information concerning a multiplex section of the communications system; and wherein the determining means performs determination based on the management information terminated by the terminating means.

Thereby, a situation in which the management cannot be transmitted due to trouble or the like can be prevented.

The determining means may obtain a pattern from the management information and thereby perform the determination.

The communications system may comprise a spare transmission circuit; and the pattern of the management information may depend on a switching over method in which the transmission circuit is switched over to the spare transmission circuit due to occurrence of trouble.

Another repeating installation, according to the present invention, in a communications system having at last one transmission circuits which transmits a multiplexed signal both ways, comprises:

a first frame synchronization switch provided at a reception side; and a second frame synchronization switch provided at a transmission side; and wherein the first and second synchronization switches operate together and are always in identical states.

Thereby, without depending on a number of repeating installations provided in the communications systems, each repeating installation can be in a signal restored state within a short time and at approximately the same time after recovery from trouble.

Other objects and further features of the present invention will become more apparent from the following detailed description when read in conjunction with the accompanying drawings.

BRIEF DESCRIPTION OF THE DRAWINGS

FIG. 2 shows a block diagram of part of a repeating installation ADM shown in FIG. 1;

FIG. 3 shows a block diagram of an example of a transmission system using a regenerator REG which is a repeating installation having an arrangement different from the repeating installation ADM;

FIG. 15 shows definitions of symbols of signals forming the section overhead SOH and line overhead LOH;

FIGS. 16A and 16B show detail of a K1 byte and a K2 byte;

FIGS. 21, 22 and 23 show a flowchart of operation in the arrangements shown in FIGS. 18, 19 and 20;

FIGS. 32A and 32B illustrate an arrangement concerning an out of frame-synchronization state and restoration therefrom when the regenerator shown in FIG. 31 is used.

DESCRIPTION OF THE PREFERRED EMBODIMENTS

Figure 1:
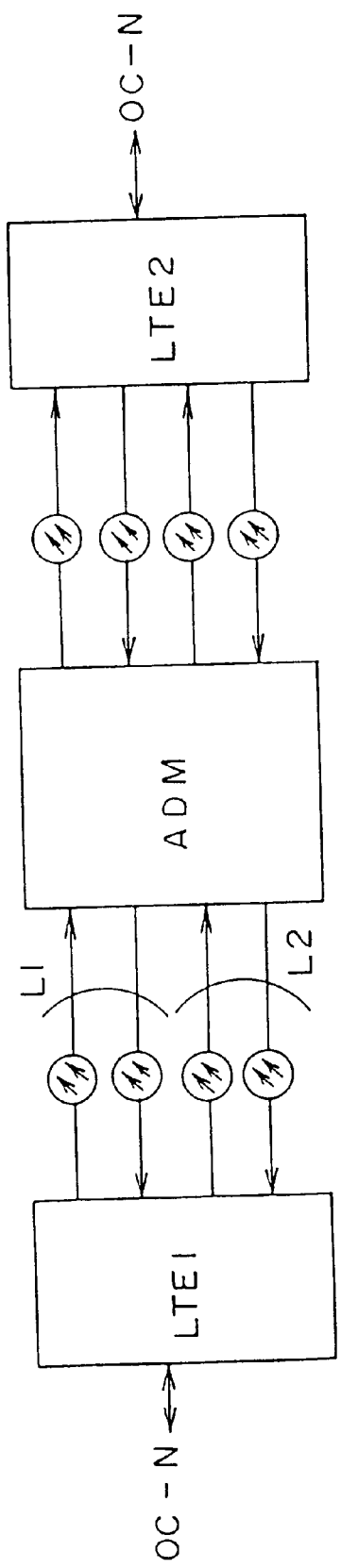
FIG. 1 shows a block diagram of an example of a SONET transmission system.
Figure 4:
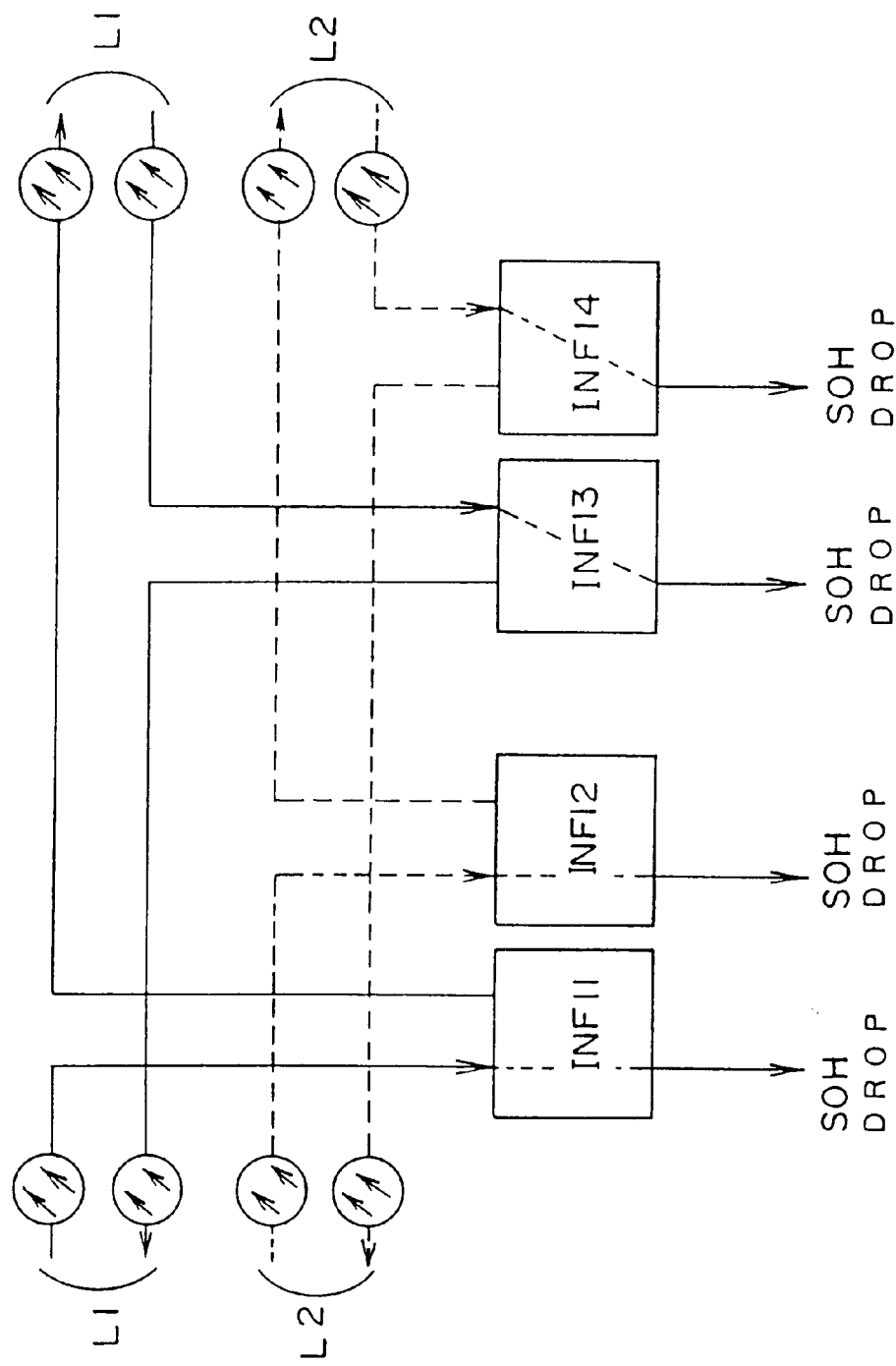
FIG. 4 shows a block diagram of part of the above-mentioned regenerator REG.
Figure 5:
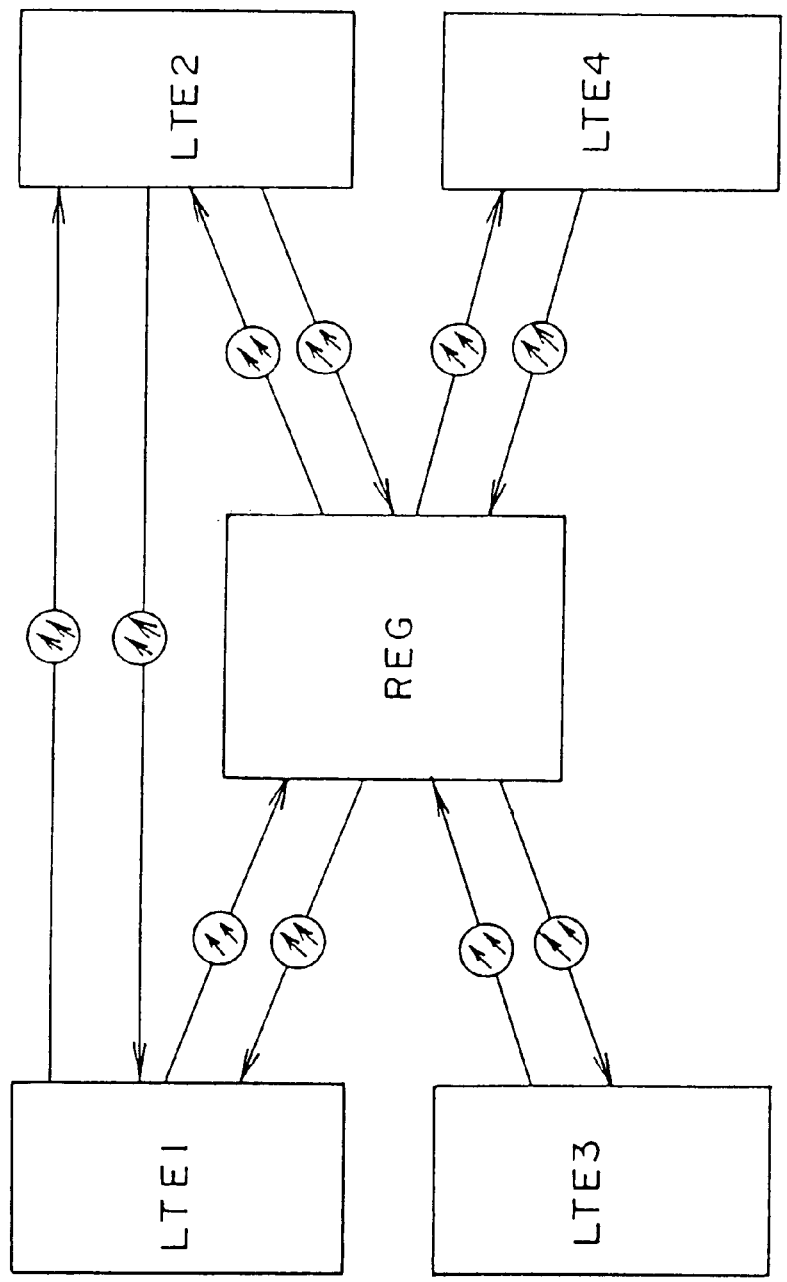
FIG. 5 shows a block diagram of another example of a transmission system using the regenerator.
Figure 6:
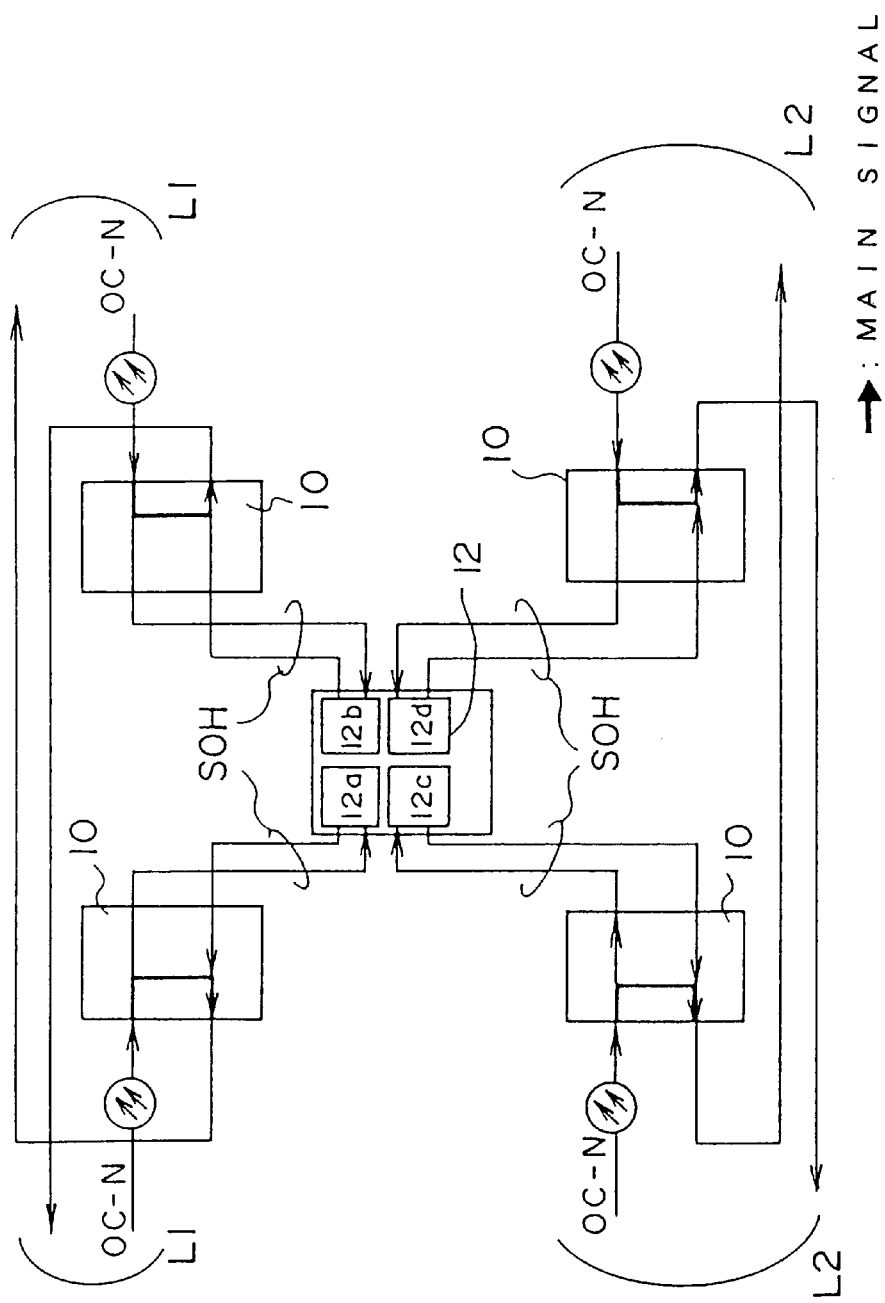
FIG. 6 shows a block diagram of part of the regenerator REG in the related art.
Figure 7:
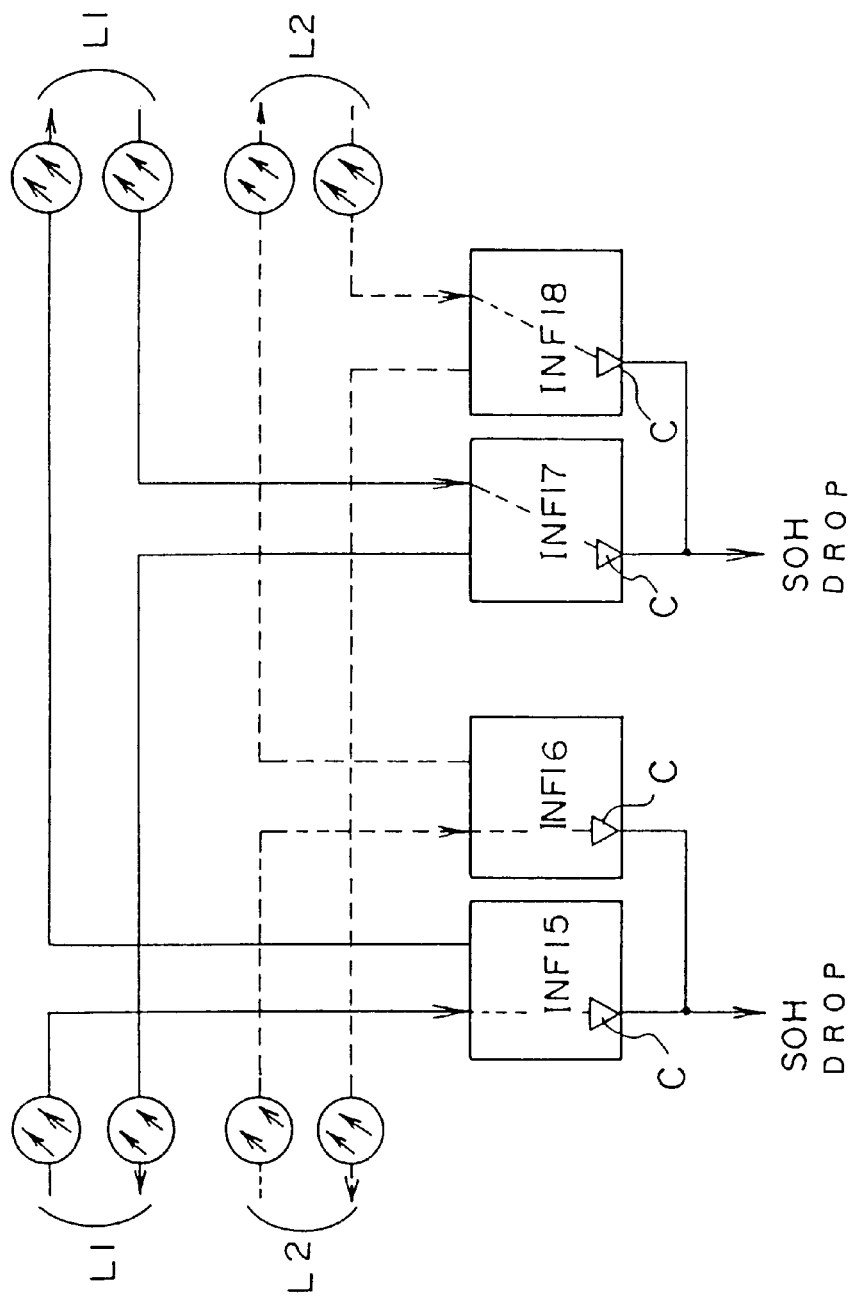
FIG. 7 shows a block diagram of part of a regenerator REG according to the present invention.

FIG. 7 shows part of a regenerator REG according to the present invention. As shown in the figure, interfaces INF15, INF16, INF17 and INF18 are provided for respective lines of transmission circuits. For example, an optical transmission circuit L1 is used as a currently used circuit and an optical transmission circuit L2 is used as a spare circuit. Each of the four interfaces INF15 through INF18 is provided with a high impedance control unit C. The high impedance control unit C of either one of the interfaces INF15 and INF16 is set to be at a high impedance, and the high impedance control unit C of either one of the interfaces INF17 and INF18 is set to be at a high impedance. Thereby, either one of the currently used circuit and spare circuit is selected and a section overhead SOH in a signal flowing through the selected circuit is extracted (terminated), while a section overhead SOH in a signal flowing through the other circuit is not terminated. Thereby, in comparison to the regenerator REG in the related art shown in FIG. 4, the number of section overheads SOH to be processed is reduced to half, and thus the device can be miniaturized, consume less power and cost less.

Figure 8:
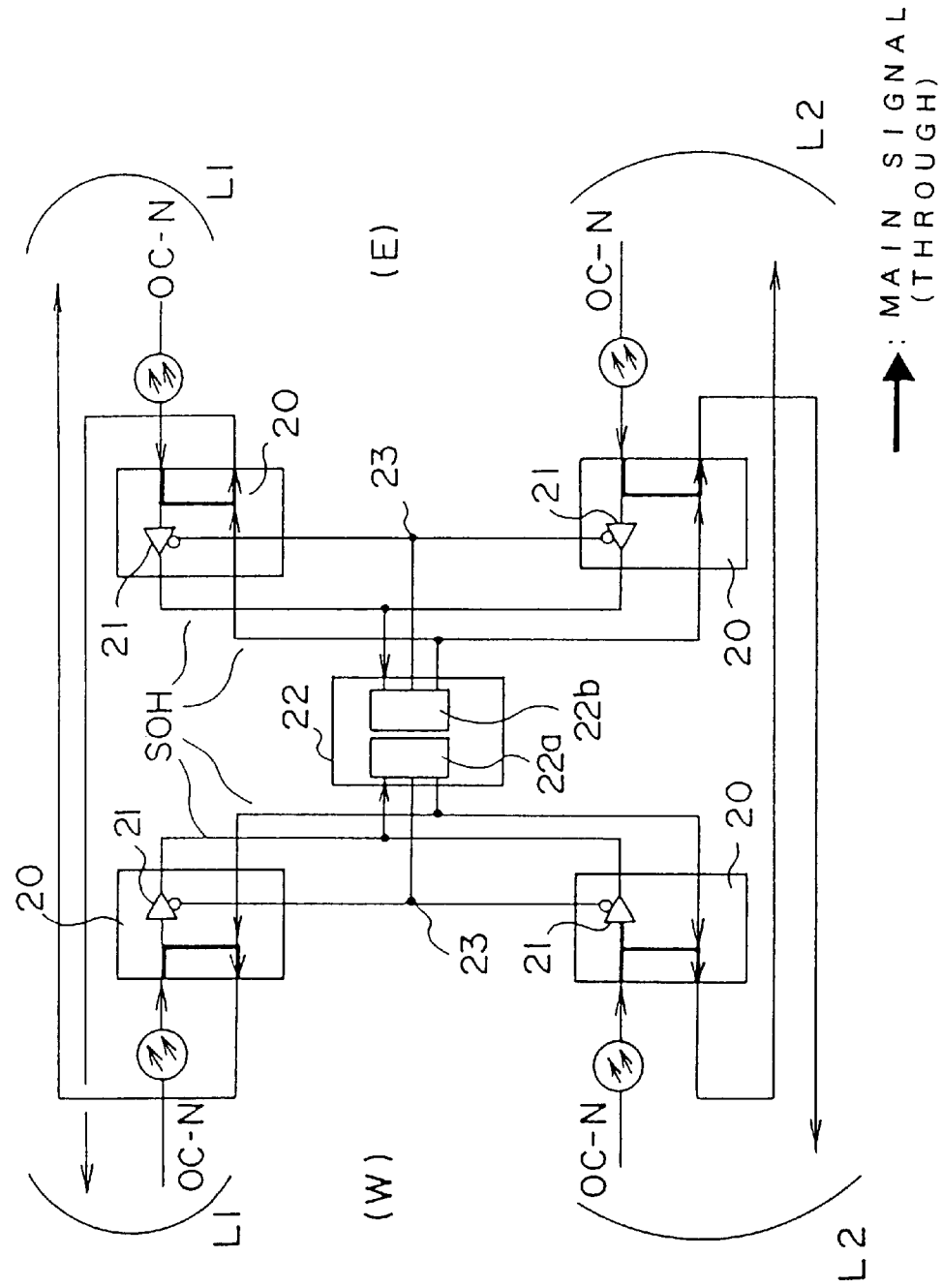
FIG. 8 shows a detailed block diagram of an arrangement shown in FIG. 7.

FIG. 8 shows a block diagram of a detail of an arrangement shown in FIG. 7. The arrangement shown in FIG. 8 will now be described as a first embodiment of the present invention.

As shown in FIG. 8, a higher-order group interface unit 20 is provided for each of the transmission lines. Each higher-order group interface unit 20 has a high impedance control unit 21 which controls termination of a section overhead SOH. It will now be assumed that the left two higher-order group interface units 20 in FIG. 8 are west-side (W) ones, and the right two higher-order group interface units 20 are east-side (E) ones. The two west-side high impedance control units 21 are controlled by a common overhead switching signal 23, and the east-side two high impedance control units 21 are controlled by a common overhead switching signal 23. According to instructions of the overhead switching signals 23, either one of the two east-side high impedance control units 21 is set at a high impedance state and either one of the two west-side high impedance control units 21 is set at a high impedance state. For example, both the east-side and west-side high impedance control units 21 belonging to the spare circuit L2 are set at the high impedance state. Either one of the two east-side high impedance control units 21 receives the above-mentioned overhead switching signal 23 via an inverter not shown in FIG. 8, and either one of the two west-side high impedance control units 21 receives the above-mentioned overhead switching signal 23 via an inverter not shown in the figure.

Main signals flow through routes indicated by bold lines in FIG. 8. Thus, the main signals pass through the regenerator REG.

Outputs of the west-side high impedance control units 21 are commonly connected to an overhead processing unit 22a in an overhead processing mechanism 22 as shown in the figure. Similarly, outputs of the east-side high impedance control units 21 are commonly connected to an overhead processing unit 22b in the overhead processing mechanism 22 as shown in the figure. Further, section overheads SOH to be inserted into the main signals are outputted from the overhead processing units 22a and 22b to the higher-order group interface units 20.

Thus, because the overhead processing unit 22a is commonly provided for the two west-side transmission lines and the overhead processing unit 22b is commonly provided for the two east-side transmission lines, the device can be miniaturized while decreasing power consumption and cost.

From FIGS. 7 and 8 as described above, it is obvious in the above-mentioned arrangement that the overhead processing unit 22a is commonly provided for the two west-side transmission lines and the overhead processing unit 22b is commonly provided for the two east-side transmission lines can be applied to a repeating installation ADM in the related art. Accordingly, it is possible to use the repeating installation ADM in the related art, modify it and thus provide the regenerator REG in the first embodiment of the present invention.

Figure 9:
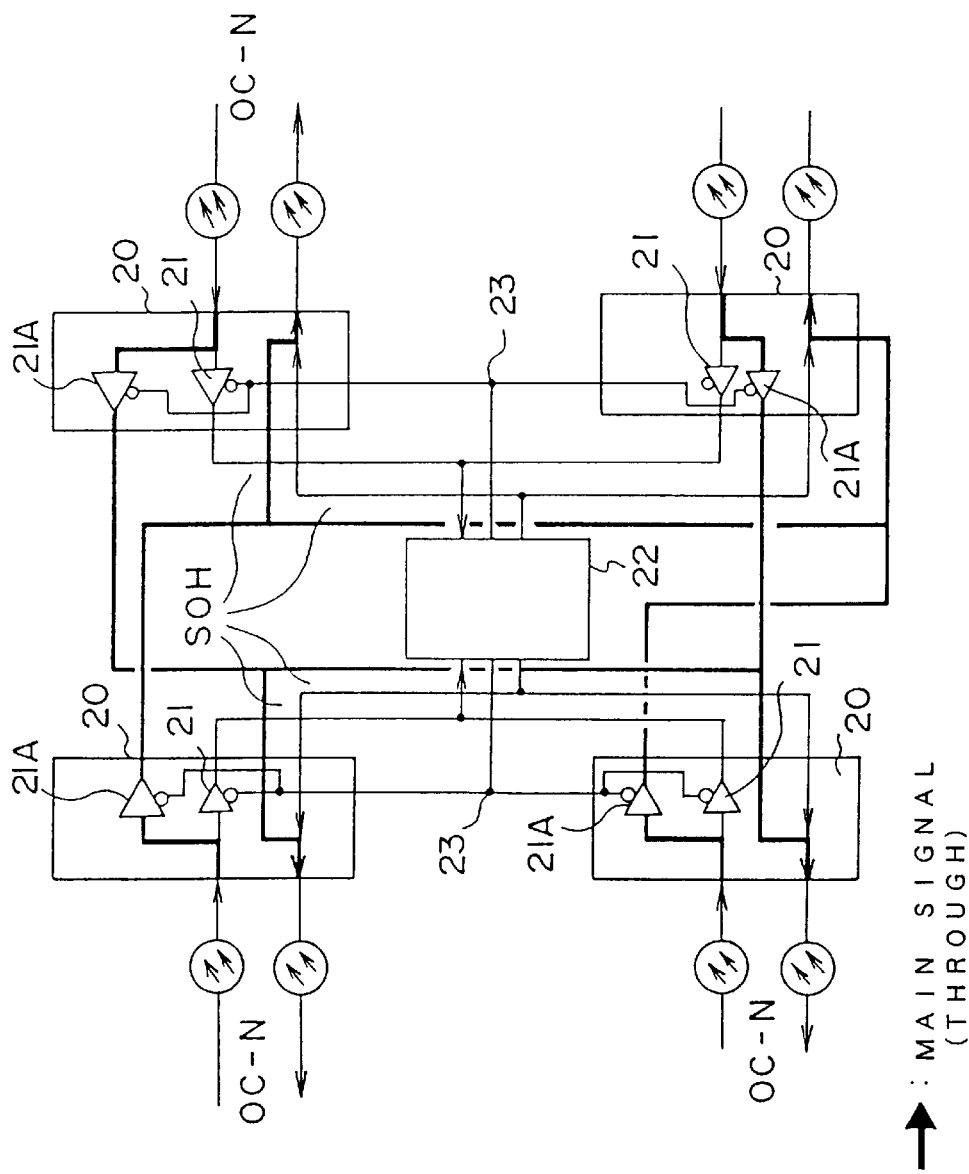
FIG. 9 shows a block diagram of an arrangement by which functions of the regenerator REG can be achieved using the repeating installation ADM.

FIG. 9 shows a block diagram of an arrangement obtained as a result of using a repeating installation ADM and providing functions of the regenerator REG. In FIG. 9, the same reference numerals are given to components that are the same as those described above. Arrows indicated by bold lines indicate routes of main signals. A main-signal high impedance control unit 21A is provided on each of the routes of the main signals. Only section overheads SOH are sent to an overhead processing mechanism 22 and the main signals pass through the regenerator REG. Thus, regenerative repeating is performed on the main signals there.

Figure 10:
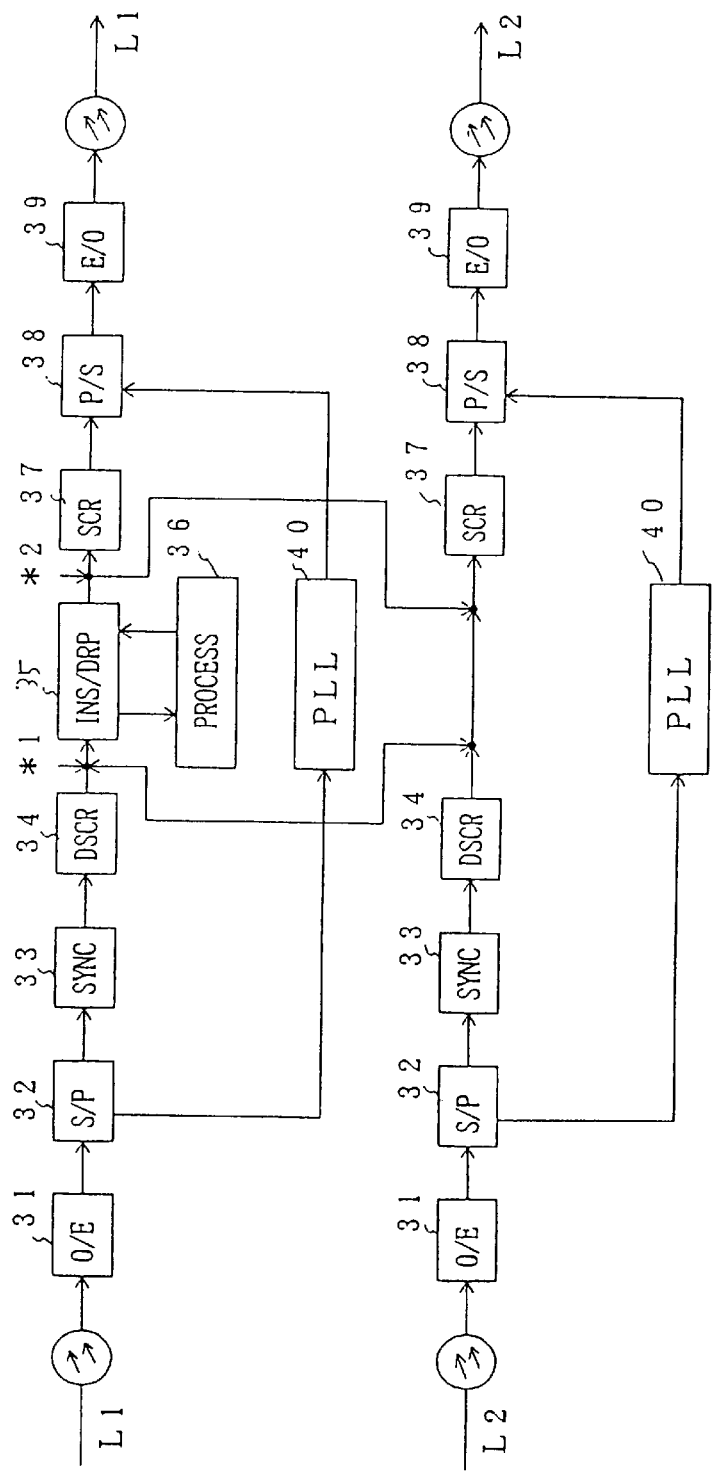
FIG. 10 shows a block diagram of part of the regenerator REG shown in FIGS. 7 through 9.

FIG. 10 shows a block diagram illustrating part of the regenerator REG shown in FIGS. 7 through 9. In FIG. 10, an arrangement relating to a transmission line of each of the transmission circuits L1 and L2 is shown. An optical signal from the transmission circuit L1 is converted into an electric signal by an optical-electric converter (O/E) 31. The electric signal is further converted into a parallel signal by a serial-parallel converter (S/P) 32. Frame synchronization is established in the parallel signal by a frame synchronization circuit (SYNC) 33. A descrambler (DSCR) 34 descrambles the frame-synchronized parallel signal. A section overhead SOH is extracted through an extracting and inserting unit (INS/DRP) 35. The extracted section overhead SOH is processed by a overhead processing unit (PROCESS) 36. Transmitted maintenance and monitoring information, for example, is obtained through the overhead processing unit 36.

Further, the overhead processing unit 36 outputs, to the extracting and inserting unit 35, a section overhead SOH to be transmitted. A transmission signal having the section overhead SOH added thereto is scrambled by a scrambler (SCR) 37. A parallel-serial converter (P/S) 38 converts the scrambled signal in a parallel form into a serial-form signal. An electric-optical converter (E/O) 39 converts the serial-form electric signal into an optical signal, and sends it to the transmission circuit L1. A PLL synthesizer 40 compares a timing signal, which is extracted through the serial-parallel converter, 32 with a timing signal which is generated by an internal oscillator, and generates operation timing of the parallel-to-serial converter 38.

A circuit which processes an optical signal from the transmission circuit L2 also has an arrangement similar to that of the above-described circuit which processes the optical signal from the transmission circuit L1, excepting the above-mentioned extracting and inserting unit 35 and overhead processing unit 36.

As described above, a circuit which processes a section overhead SOH is commonly used for the transmission circuits L1 and L2. Therefore, the extracting and inserting unit 35 and overhead processing unit 36 are commonly provided for the transmission circuits L1 and L2. An output signal of the descrambler 34 for the transmission circuit L2 is supplied to the extracting and inserting unit 35. The above-described high impedance control unit 21 is provided at a part indicated by *1 shown in FIG. 10. Further, an output of the extracting and inserting unit 35 is also connected to the scrambler 37 for the transmission circuit L2. The above-described high impedance control unit 21 is provided at a part indicated by *2 shown in FIG. 10.

Further, a main signal from the transmission circuit L2 passes through the regenerator REG and thus regenerative repeating is performed on the main signal. Therefore, FIG. 10 indicates an arrangement such that the main signal is transmitted directly from the descrambler 34 to the scrambler 37. A switching control of the high impedance control units 21 provided at the points *1 and *2 is performed by an overhead switching signal (corresponding to the signal 23 shown in FIG. 9) outputted by the overhead processing unit 36. In FIG. 10, the overhead switching signal is omitted for convenience.

Figure 11:
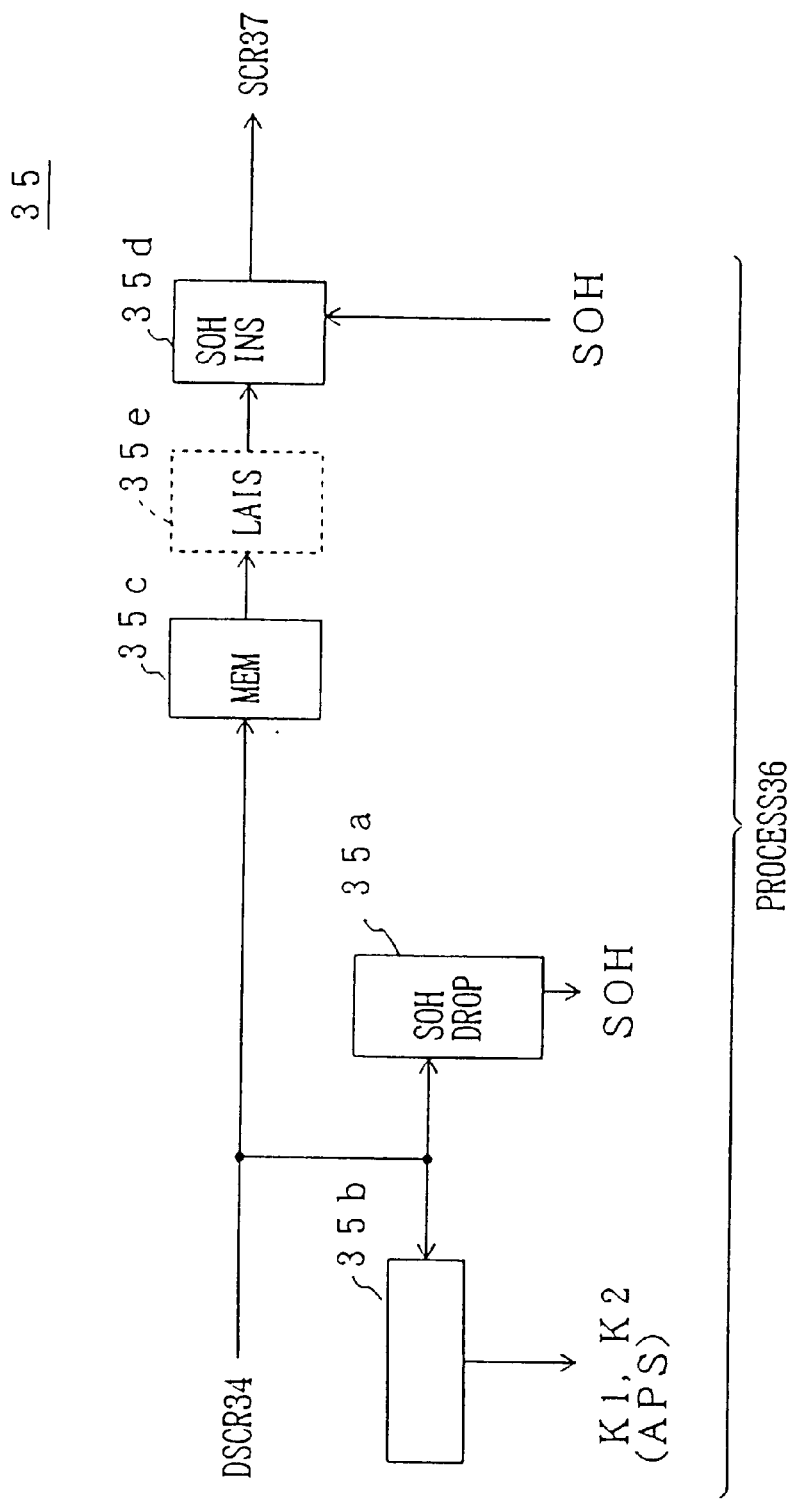
FIG. 11 shows an arrangement of an extracting and inserting unit 35 shown in FIG. 10.

FIG. 11 shows an arrangement of the extracting and inserting unit 35 shown in FIG. 10. A section overhead extracting unit 35a extracts a section overhead SOH from a signal from either one of the descramblers 34. An APS (Automatic Protection Switch) extracting unit 35b extracts an automatic protection switch (APS) having K1 and K2 bytes. The APS extracting unit 35b will be described later. A memory (MEM) 35c is used for controlling a frequency, and temporarily stores a main signal. A section overhead inserting unit 35d adds a section overhead SOH from the overhead processing unit 36 to the top of the main signal, and outputs a resulting signal to the scrambler 37. A block 35e will be described later. Here, it is to be assumed that an output of the memory 35c is directly supplied to the section overhead inserting unit 35d.

Hereinbefore, the regenerator REG in the first embodiment of the present invention has been described. Because the section overhead processing unit is commonly used, the device can be miniaturized, consume less power and cost less.

A second embodiment of the present invention will now be described. A feature of the second embodiment is that impedance setting of the high impedance control unit 21 shown in FIG. 8 is performed adaptably to possible trouble occurring in the transmission circuit. For example, if trouble occurs in the currently used transmission circuit, the spare transmission circuit is used as the currently used transmission circuit and setting of the high impedance control unit 21 is accordingly changed.

Figure 12A:
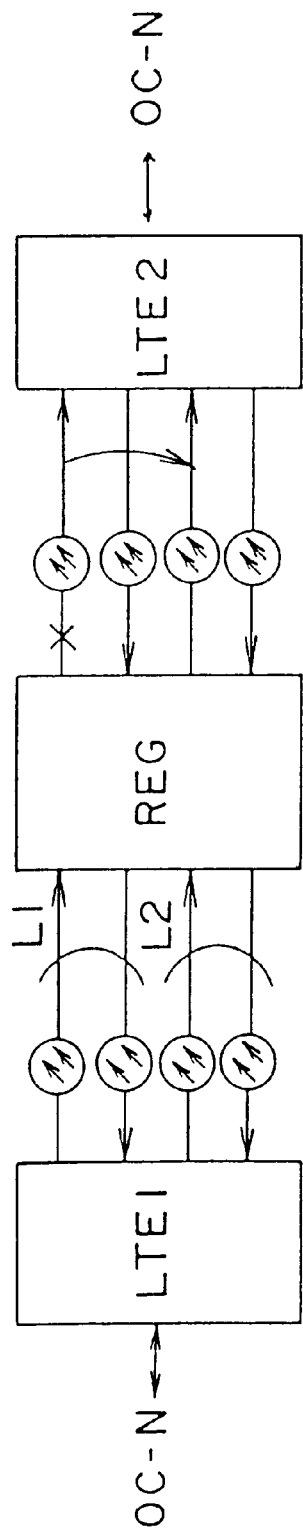
FIGS. 12A and 12B illustrate transmission line switching over methods.
Figure 12B:
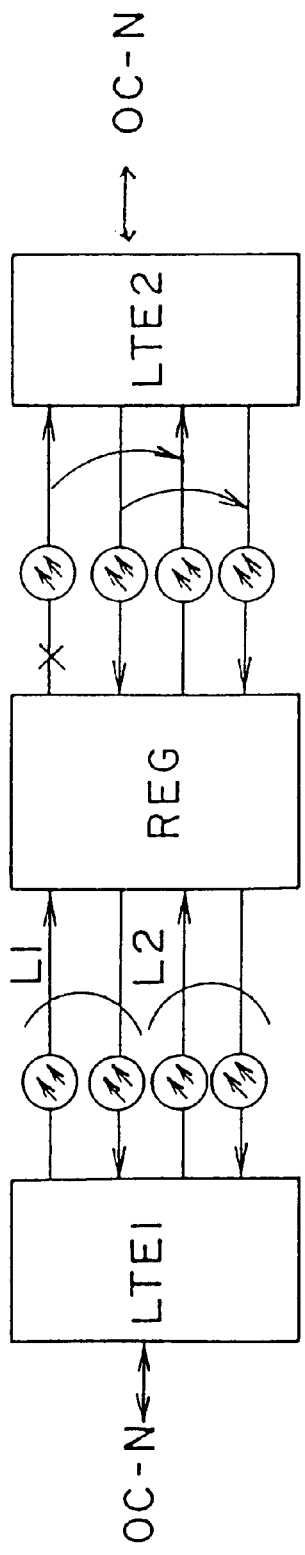

With reference to FIGS. 12A and 12B, switching over of the currently used transmission circuit will now be described. FIG. 12A shows a unidirectional switching-over method and FIG. 12B shows a bidirectional switching-over method. In FIG. 12A, when trouble as indicated by 'x' occurs in a transmission line of the currently used transmission circuit Ll, according to the unidirectional switching-over method, the trouble is detected by a reception side (the line terminated equipment LTE2, in this case), and a transmission line of the spare transmission circuit corresponding to the transmission line having the trouble, of the currently used transmission circuit is then used as a currently used line. In FIG. 12B, when a trouble indicated by 'x' occurs in a transmission line of the currently used transmission circuit L1, according to the bidirectional switching method, the trouble is detected by a reception side (the line terminated equipment LTE2, in this case), and the spare transmission circuit is then used as the currently used circuit. In other words, according to the bidirectional switching-over method, not only the transmission line having trouble in the original currently used transmission circuit L1 but also the other transmission line not having trouble of the same transmission circuit L1 is then not used, and accordingly the two transmission lines of the spare transmission circuit L2 are used as the new currently used transmission circuit.

Changing control of the high impedance control unit 21 in the second embodiment can be applied to any one of the above-mentioned methods shown in FIGS. 12A and 12B. When a trouble occurs, APS bytes transmitted between the line terminated equipment LTEs are monitored by the regenerator REG and thus completion of transmission line switching-over (completion of an APS protocol) is detected. Thereby, termination of a section overhead SOH is automatically switched over from a currently used one to a spare one.

In order to describe APS bytes, a section overhead SOH and a pass overhead POH will now be described.

Figures 13A, 13B:
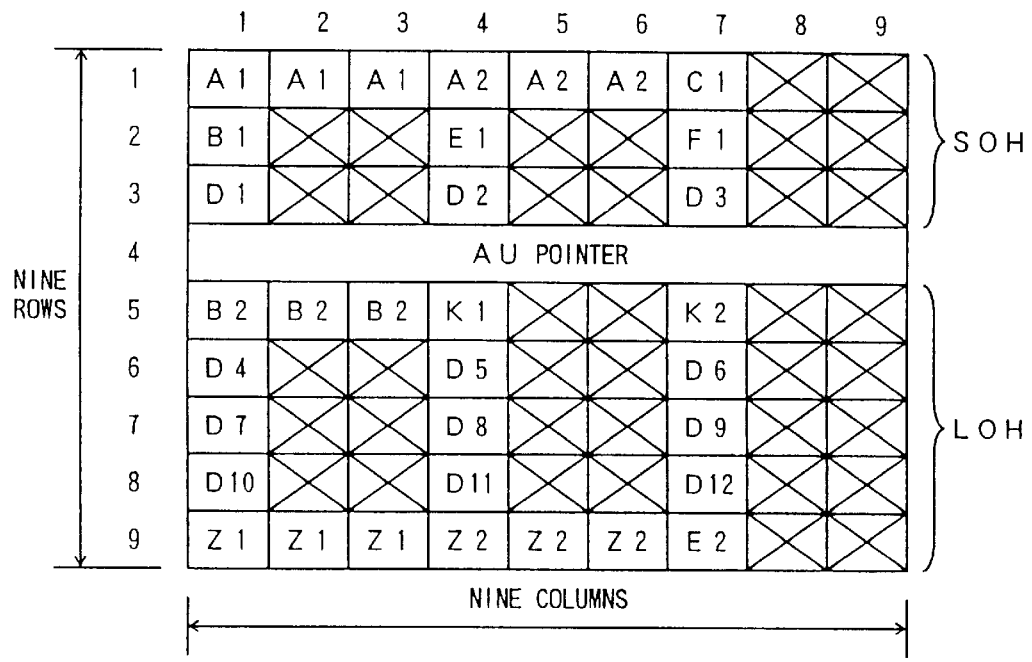
FIG. 13A shows a section overhead SOH and a line overhead LOH.
FIG. 13B shows a pass overhead POH.

FIG. 13A shows a section overhead SOH and a line overhead LOH. FIG. 13B shows a pass overhead POH. As is well known, the section overhead SOH has an arrangement of three rows by nine columns, and the line overhead LOH has an arrangement of five rows by nine columns. Further, the pass overhead POH has an arrangement of nine rows by one column.

Figure 14:
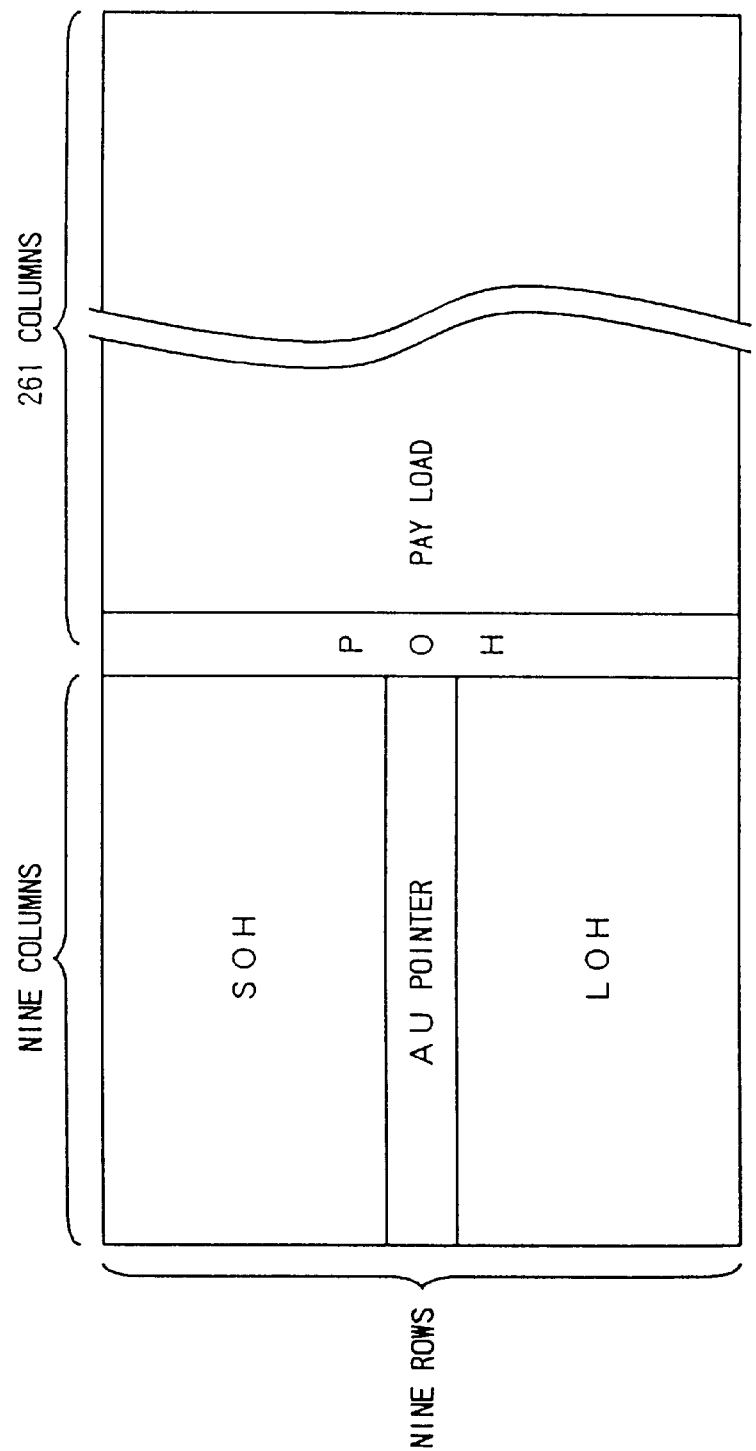
FIG. 14 shows a format of a transmission signal.

FIG. 14 shows a format of a transmission signal. The pass overhead POH and line overhead LOH are added to the top of a main signal, referred to as a payload and having the POH at the top thereof. An AU pointer indicates the top of one unit of multiplexed information in the payload.

FIG. 15 shows definition of symbols of information which forms the section overhead SOH and line overhead LOH. As described above, the section overhead SOH is used for managing between repeating installations (ADM, REG or the like). The line overhead LOH is used for managing between line terminated equipment LTES. The above-described APS bytes are contained in the line overhead LOH and include K1, K2 bytes. The K1 byte is information concerning switching-over of a transmission circuit. The K2 byte is information concerning transfer of multiplex section state.

FIGS. 16A, and 16B show details of the K1 byte and K2 byte, respectively. These bytes are part of the line overhead LOH and ordinarily terminate at the line terminated equipment, and a control according to a well-known APS protocol is performed. The K1 byte contains information of the type of request and switching request channel. The K2 byte contains information of bridging channel, 1+1/1:1, and mode of operation.

The type of request indicates transmission line switching-over status, condition, and external control contents. The switching request channel indicates currently used transmission line numbers (for example, 0 through 15) on which switching over is performed in transmission line tail-end (reception side) equipment. The bridging channel indicates currently used transmission line numbers (for example, 0 through 15) on which bridging is performed in transmission line tail-head (transmission side) equipment. The information of 1+1/1:1 indicates whether a system architecture is 1+1 of 1:1. The mode of operation indicates information of unidirectional, bidirectional, line alarm indication signal (which may be referred to as LAIS) and line far end receptive failure (which may be referred to as LFERF).

Figure 17:
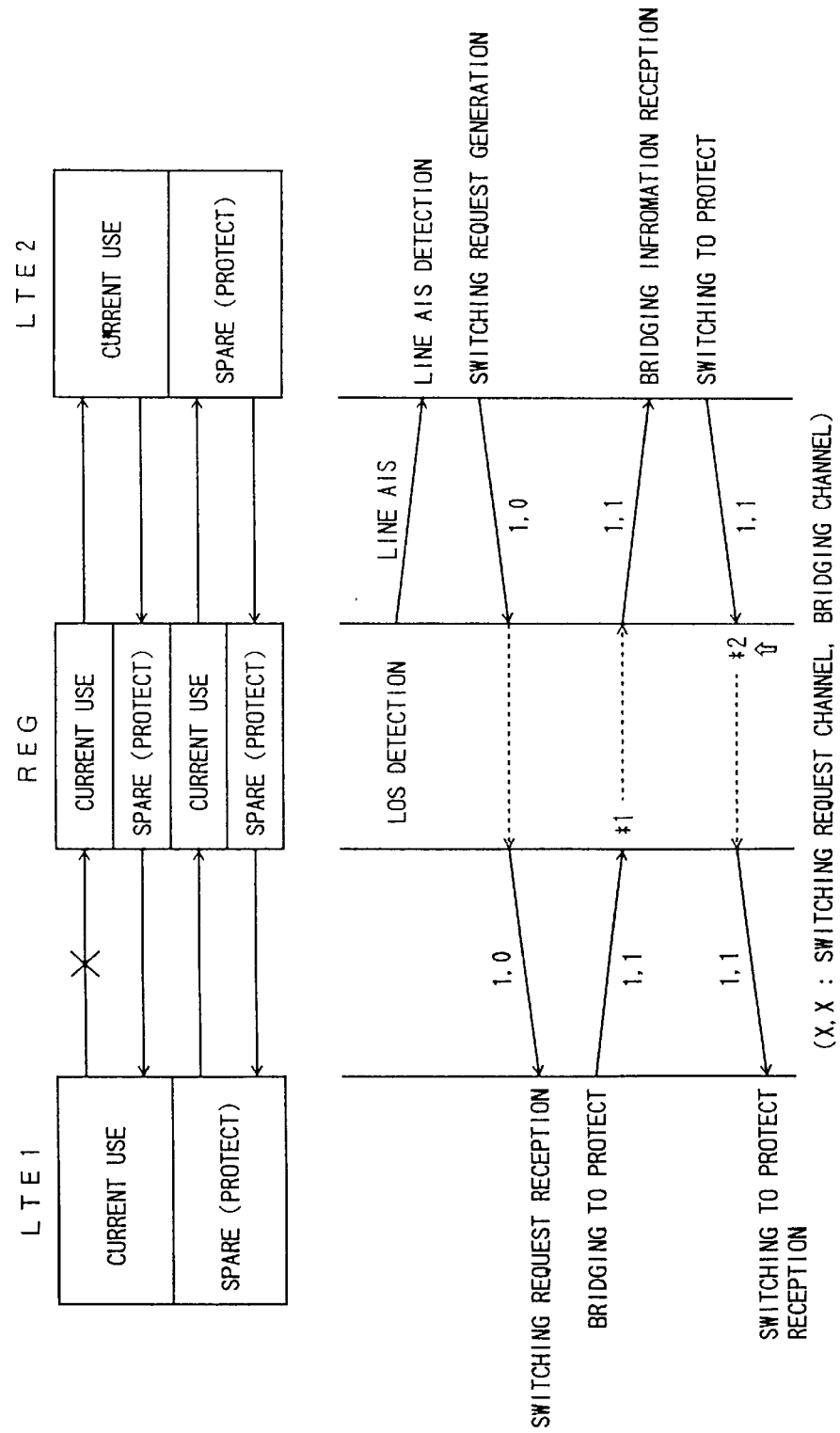
FIG. 17 illustrate a second embodiment of the present invention.

With reference to FIG. 17, operation of the second embodiment of the present invention will now be described. When the above-described regenerator REG monitors the above-mentioned APS bytes (K1, K2) and trouble occurrence or the like causes a transmission line to be switched over, the regenerator REG switches over a section overhead SOH to be terminated.

First, the regenerator REG detects a loss of signal (LOS) occurring in an LTE1 side currently used transmission line, and sends a line alarm indication signal (LAIS) to an LTE2 side currently used transmission line. This signal is generated by the block 35e shown in FIG. 11. The LTE2 detects the line alarm indication signal LAIS and generates a switching request for switching over to a spare transmission line (protect line). This generation of the switching request is performed as a result of setting '1' in the switching request channel of K1 byte and setting '0' in the bridging channel of K2 byte. The switching request from the line terminated equipment LTE2 passes through the regenerator REG and is received by the LTE1.

The LTE1 performs a predetermined operation and thus determines whether or not the switching request is effective. If a determination result is that the request is effective, the LTE1 performs bridging or switching-over to a spare transmission line, sets '1' in the switching request channel of K1 byte and sets '1' in the bridging channel of K2 byte. The regenerator REG monitors the above-mentioned "1, 1" received through the spare transmission line (*1 in FIG. 17).

The K1, K2 bytes are extracted by the APS extracting unit 35b shown in FIG. 11 and determination is performed on these bytes by the overhead processing unit.

Further, the above-mentioned K1, K2 bytes are sent to and received by the line terminated equipment LTE2. The LTE2 which receives bridging information switches over a currently used transmission line to a spare side, and continues to send information in which the switch request channel and bridging channel are maintained as a spare side. The regenerator REG, when monitoring the above-mentioned "1, 1" (*2 in FIG. 17), confirms that the switching request channel and bridging channel indicated by the received APS bytes agree between the LTE1 and LTE2. As a result, the regenerator REG switches over the section overhead SOH to be received to a spare side (switches over setting of high impedance to a spare side).

Thus, although transmission line changing over is performed due to trouble occurrence or the like, a section overhead SOH can be normally received.

A third embodiment of the present invention will now be described. An object of the third embodiment is to cause, when a transmission line has been appropriately switched over due to occurrence of trouble or the like, part of the information of a section overhead SOH to pass through the regenerator REG without being terminated therein and thereby prevent useless alarm generation or communications break from occurring.

Figure 18:
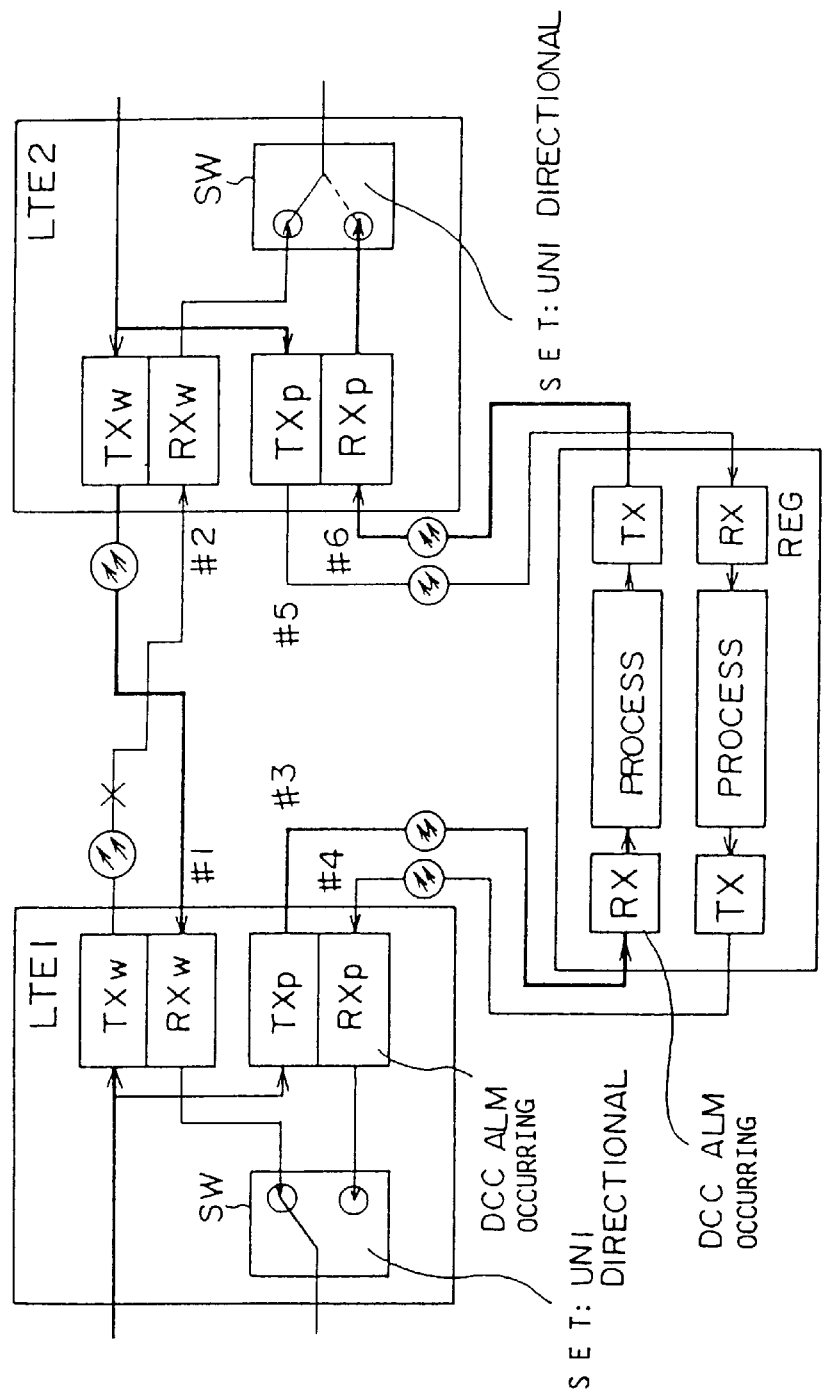
FIG. 18 shows an arrangement in which line terminated equipment LTE1 and LTE2, which face each other in a point-to-point network arrangement, are directly connected with each other through a currently used transmission circuit and are connected with each other via the regenerator REG through a spare transmission circuit.

FIG. 18 shows an arrangement in which, in line terminated equipment LTE1 and LTE2 facing each other in a point-to-point network arrangement, a currently used transmission circuit directly connects the line terminated equipment LTE1 and LTE2 with each other, and a spare transmission circuit connects the line terminated equipment LTE1 and LTE2 with each other via a regenerator REG. In the figure, transmission units TXw and TXp are transmission units for the currently used transmission circuit and spare transmission circuit, respectively. Similarly, reception units RXw and RXp are reception units for the currently used transmission circuit and spare transmission circuit, respectively. Spare transmission line switches SW perform the above-described unidirectional switching-over method. The regenerator REG contains transmission units TX, reception units RX and section overhead processing units PROCESS. The currently used transmission circuit contains currently used transmission lines #1 and #2, and the spare transmission circuit contains spare transmission lines #3, #4, #5 and #6.

Although the regenerator REG accommodates both-way transmission circuits, FIG. 18 only shows a single-way transmission circuit. In the case where the regenerator REG is used as shown in FIG. 18, it is possible to set a mode in which a section overhead SOH passes through the regenerator REG because the LTE1 and LTE2 are directly connected. Description will now be made on the assumption that the regenerator REG shown in FIG. 18 normally allows a section overhead SOH passing therethrough.

If trouble (primary trouble) indicated by 'x' in FIG. 18 occurs in the currently used transmission line #2, according to a procedure similar to the procedure described above with reference to FIG. 17, a currently used circuit is switched over from the currently used transmission circuit to the spare transmission circuit. By this switching-over, a section overhead SOH terminated in the regenerator REG is switched over to a spare side one. However, if data communications D1 through D3 bytes shown in FIGS. 13A and 15 in the overhead SOH are terminated, a DCC alarm is generated in the reception unit RX of the regenerator REG connected with the spare transmission line #3 and in a spare side unit of the reception units RXp of the LTE1. The data communications D1 through D3 bytes (which may be referred to as 'DCC') are communicated in a handshake manner, and therefore the DCC alarm is generated when an acknowledge signal is not received by the reception side equipment.

The line terminated equipment LTE2 having detected the trouble in the currently used transmission line #2 operates the spare transmission line switch SW and thus switches over to a spare side line. A signal from the LTE1 is received by the spare side reception unit RXp in the LTE2 via the spare transmission line #3, regenerator REG and then spare transmission line #6. Because the regenerator REG terminates the section overhead SOH, the D1 through D3 bytes are terminated there. Accordingly, any acknowledge signal to the D1 through D3 bytes from the LTE1 cannot be received by the LTE1, and therefore the DCC alarm is generated in the reception unit RXp of the LTE1. Similarly, the DCC alarm is generated in the reception unit RX of the regenerator REG connected with the transmission line #3.

In order to prevent such a DCC alarm from being generated, in a case where the spare transmission line switch SW operates in the unidirectional switching-over method and trouble has occurred in a currently used transmission line, the D1 through D3 bytes are made to pass through the regenerator REG. A procedure of this operation will be described later.

Further, in addition to the D1 through D3 bytes, if an E1 byte (voice order), an F1 byte (trouble specification) and a B1 byte (error monitoring) in the section overhead SOH are also made to pass through the regenerator REG without being terminated therein, transfer of such information can be prevented from being broken therein.

Figure 19:
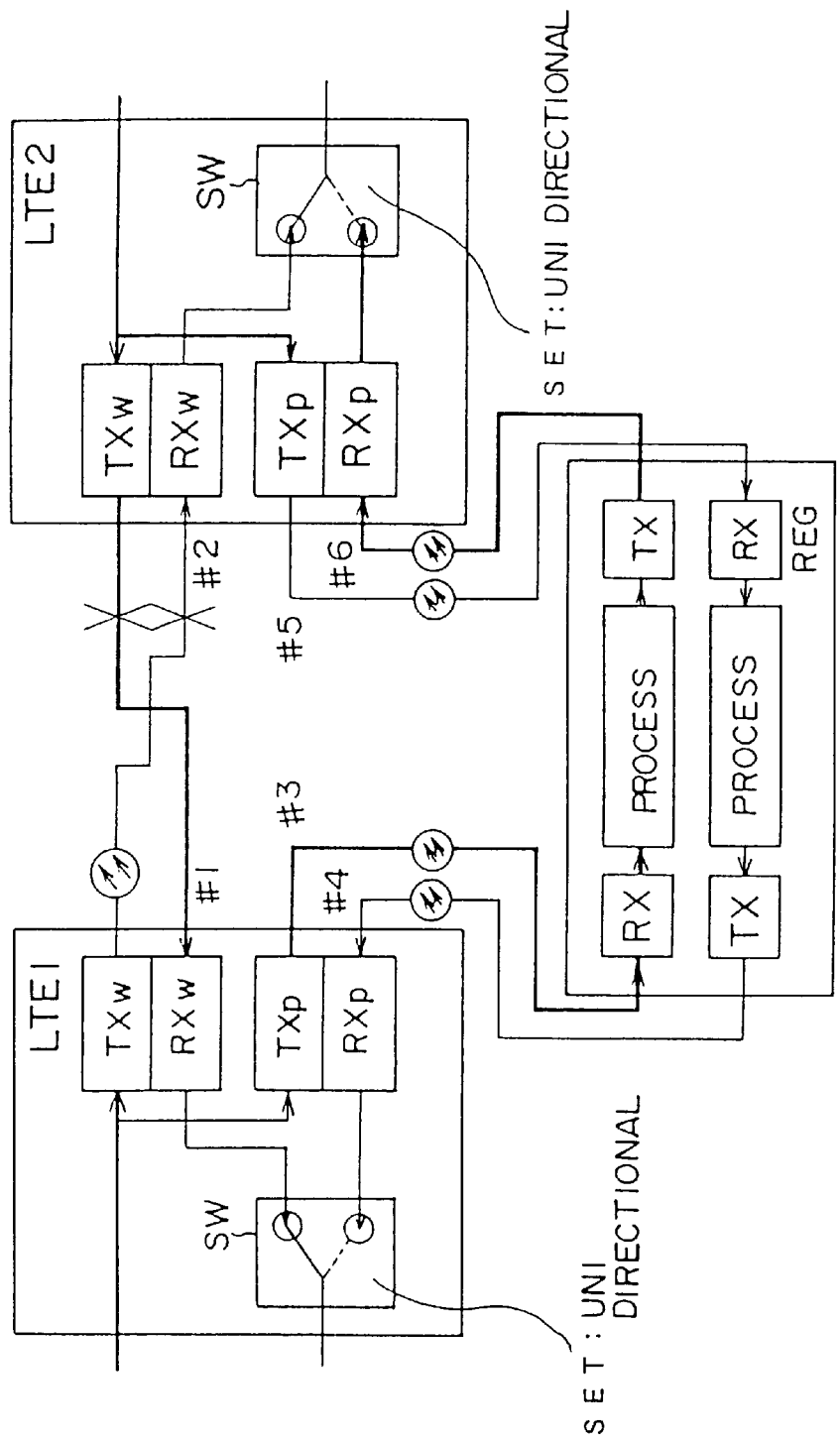
FIG. 19 shows an arrangement in which spare transmission line switches SW in the line terminated equipment LTE1 and LTE2 operate in a unidirectional switching over method, and a primary trouble occurs in a currently used transmission line #1 and a secondary trouble occurs in a currently used transmission line #2.

FIG. 19 shows a case where the spare transmission switches SW in the line terminated equipment LTE1 and LTE2 operate in the unidirectional switching-over method, a primary trouble occurs in the currently used transmission line #1, and a secondary trouble occurs in the currently used transmission line #2. Normally, the regenerator REG is set so as to cause a section overhead SOH to pass therethrough. Each of the line terminated equipment LTE1 and LTE2 having detected a respective one of these troubles causes a respective one of the spare transmission line switches SW to switch over to a respective one of the spare transmission lines #4 and #6. In this case, control is performed such that the D1 through D3 bytes, E1 byte, F1 byte and B1 byte are both-way terminated in the regenerator REG. Thereby, it is possible to ensure functions achieved by these bytes between the regenerator REG and the line terminated equipment LTE1, LET2. A procedure in the case of FIG. 19 will be described later.

Figure 20:
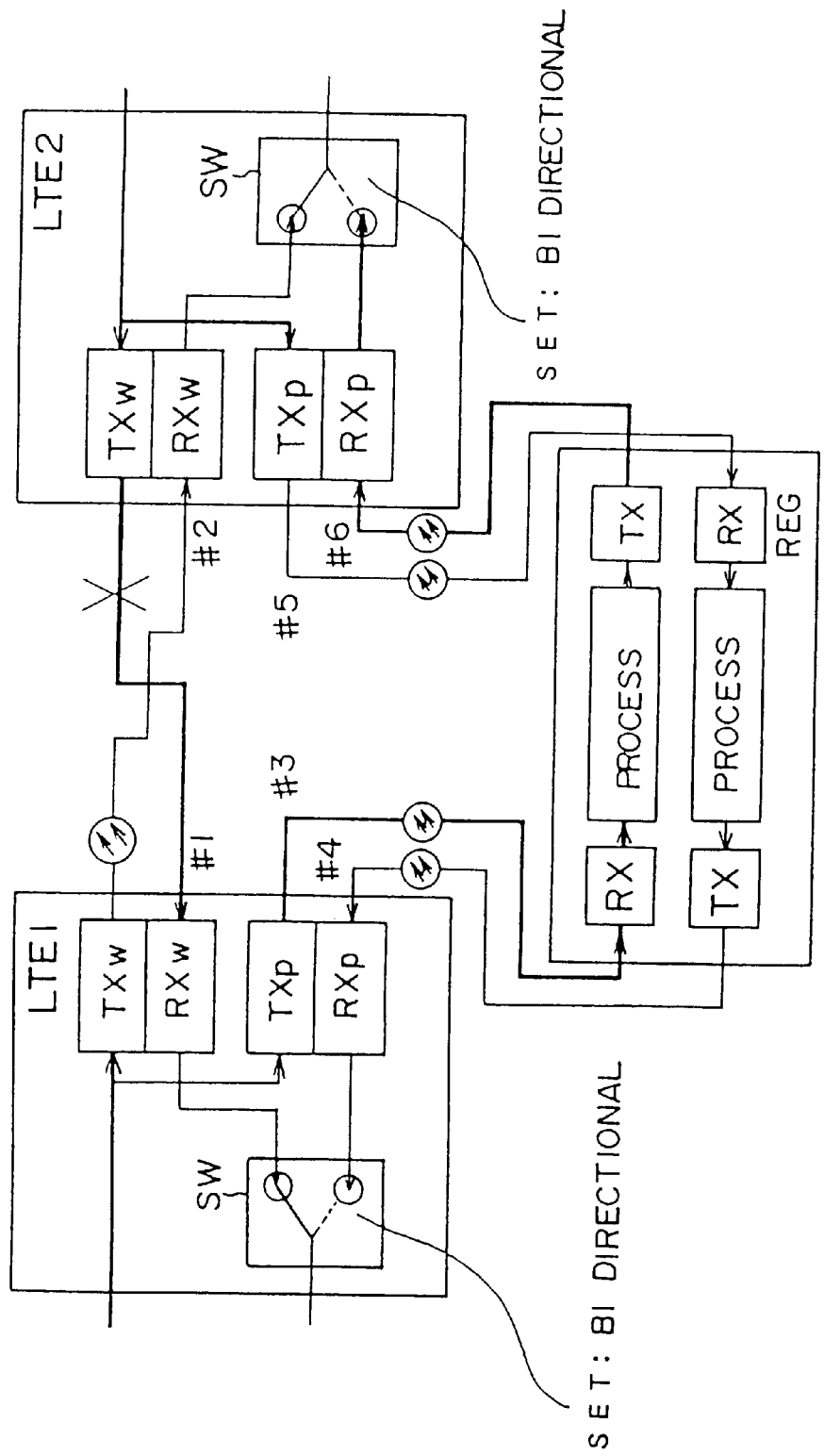
FIG. 20 shows an arrangement in which the spare transmission line switches SW in the line terminated equipment LTE1 and LTE2 operate in a bidirectional switching over method and a primary trouble occurs in a currently used transmission line #1.

FIG. 20 shows a case where the spare transmission switches SW in the line terminated equipment LTE1 and LTE2 operate in the bidirectional switching-over method and a primary trouble occurs in the currently used transmission line #1. Normally, the regenerator REG is set so as to cause a section overhead SOH to pass therethrough. In the case of FIG. 20, the line terminated equipment LTE1 having detected the troubles occurring in the current use transmission line #1 causes the spare transmission line switch SW thereof to switch over from the troubled currently used transmission line #1 to the spare transmission line #4. In addition to this, the other line terminated equipment LTE2 also causes the spare transmission line switch SW thereof to switch over from the currently used transmission line #2 in which no trouble occurs to the spare transmission line #6. Also in this case, control is performed such that the D1 through D3 bytes, E1 byte, F1 byte and B1 byte are both-way terminated in the regenerator REG. Thereby, it is possible to ensure functions achieved by these bytes between the regenerator REG and the line terminated equipment LTE1, LET2. A procedure in the case of FIG. 20 will also be described later.

Figure 22:
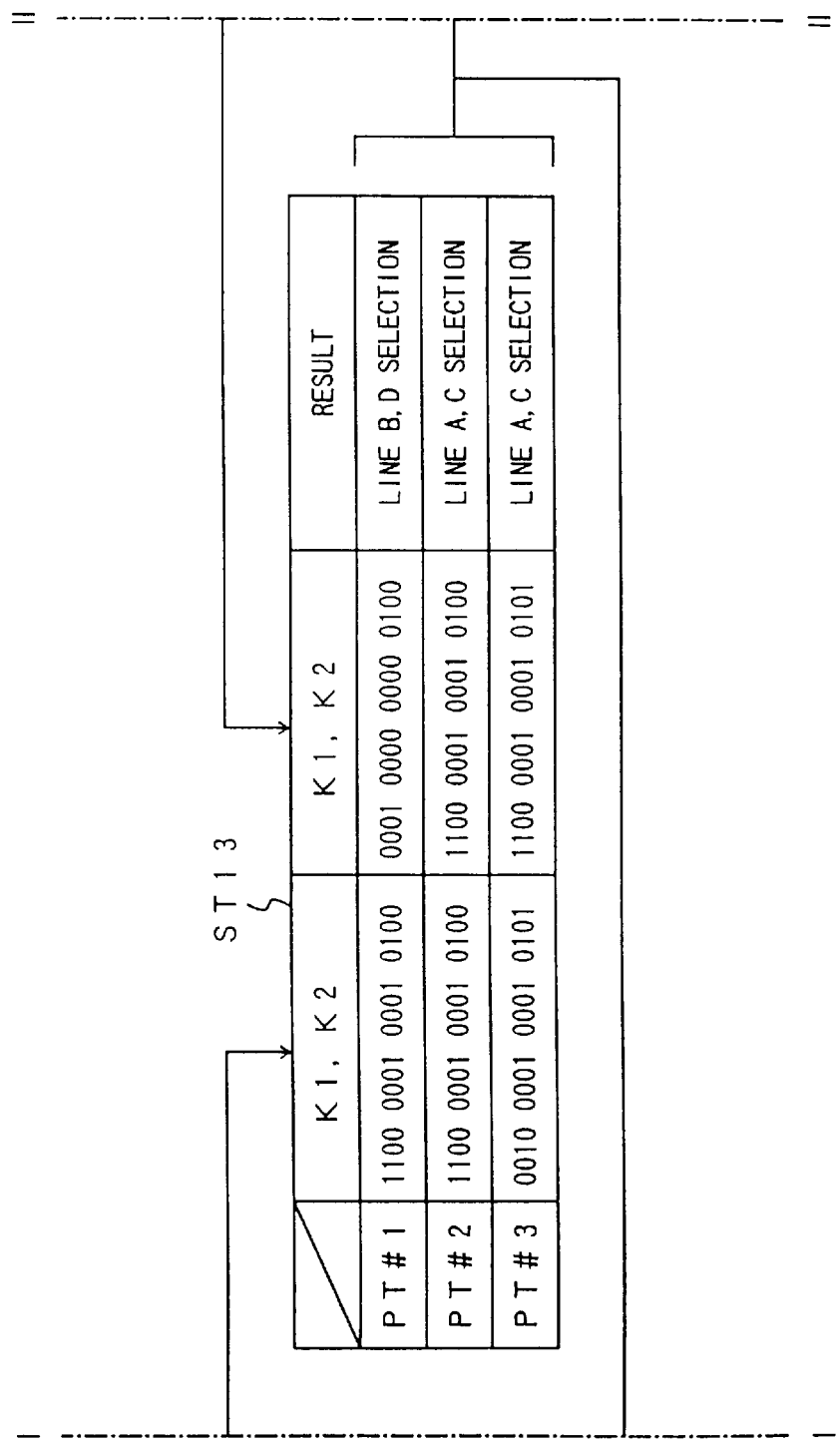
Figure 23:
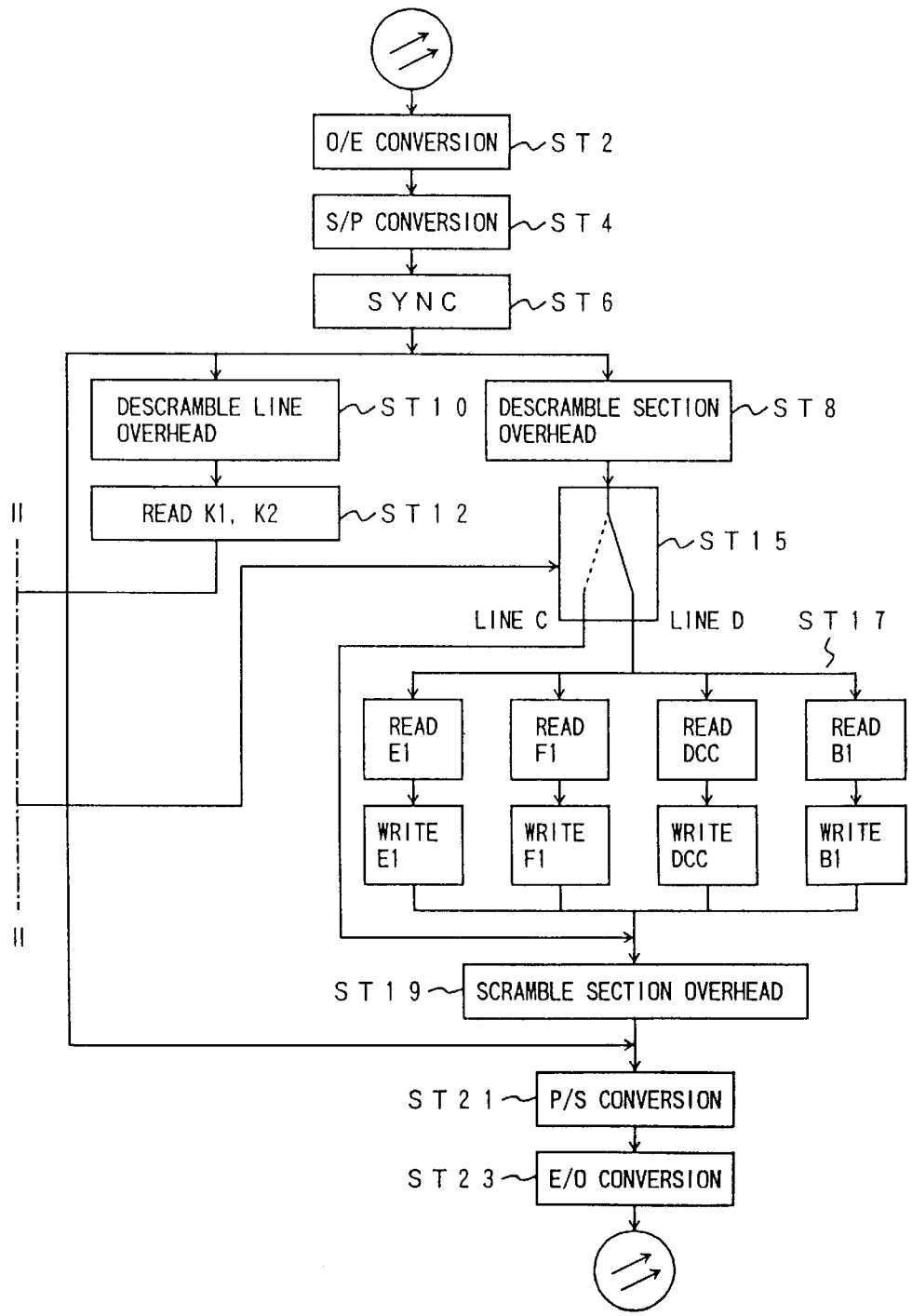

FIGS. 21, 22 and 23 show a flowchart indicating operation in the arrangements shown in FIGS. 18, 19 and 20. FIGS. 21 and 22 are coupled with each other at a line I—I, and FIGS. 22 and 23 are coupled with each other at a line II—II. The operation of this flowchart is an operation performed by units in the regenerator REG shown in FIGS. 10 and 11. FIG. 21 shows an operation where a signal is input from the transmission line #3 and output to the transmission line #6. FIG. 23 shows an operation where a signal is input from the transmission line #5 and output to the transmission line #6. FIG. 22 shows a step including a table which is referred to in the operation of FIGS. 21 and 23.

An optical signal received from the transmission line #3 is converted through the optical-electric converter 31 shown in FIG. 9 into a serial-form electric signal in a step ST1. Then, the resulting signal is converted through the serial-parallel converter 32 into a parallel-form signal in a step ST3. The frame synchronization circuit 33 establishes a frame synchronization of the resulting signal in a step ST5. The descrambler 34 performs steps ST7 and ST9. In the step ST7, the descrambler 34 descrambles a section overhead SOH. In the step ST9, the descrambler 34 descrambles a line overhead LOH. In a step ST11, K1 and K2 bytes are read.

Then, in a step ST13 shown in FIG. 22, the processing unit 36 determines, from values of K1 and K2 bytes, which pattern of three patterns PT#1, PT#2 and PT#3 is indicated. In FIG. 21, a line is selected from lines A and B in a section overhead switching over step ST14. In a step ST15 shown in FIG. 23, a line is selected from lines C and D. These selections will now be described with reference to FIG. 11. When the line B or C is selected, the section overhead SOH read out from the memory 35c passes through the section overhead inserting unit 35d. When the line A or D is selected, the section overhead SOH from the processing unit 36 is outputted to the scrambler 37.

After a pattern is specified in the step ST13, a corresponding line is selected in the step ST14. If the line A is selected, the processing unit 36 performs reading and writing of E1, F1, DCC (D1 through D3) and B1 bytes in a step ST16. After performing of the step ST16 or performing the step ST14, the scrambler 37 scrambles the section overhead SOH in a step ST18. In a step ST20, the parallel-serial converter 38 performs parallel-serial conversion. In a step ST22, the electric-optical converter 39 converts a resulting signal into an optical signal which is then sent to the transmission line #6.

The operation shown in FIG. 23 is similar to the operation shown in FIG. 21. Specifically, each step STn shown in FIG. 23 corresponds a respective step STn-1 shown in FIG. 21.

Operation shown in FIG. 22 will now be described. In the arrangement shown in FIG. 18, in a case where the line terminated equipment LTE1 and LTE2 operate using the currently used transmission lines #1 and #2, the regenerator REG is set so as to cause a section overhead SOH to pass therethrough. Even if trouble occurs in the transmission line #2, the pattern PT#1 is detected from K1 and K2 bytes of a line overhead LOH in the step ST13 shown in FIG. 22 and thereby the regenerator REG causes a section overhead SOH to pass therethrough.

In the arrangement shown in FIG. 19, in a case where the line terminated equipment LTE1 and LTE2 operate using the currently used transmission lines #1 and #2, the regenerator REG is set so as to cause a section overhead SOH to pass therethrough. When troubles occur in both transmission lines #1 and #2, the pattern PT#2 is detected from K1 and K2 bytes of a line overhead LOH in the step ST13 shown in FIG. 22 and thereby the regenerator REG causes a section overhead SOH to be terminated therein. Thereby, information transfer between the regenerator REG and the line terminated equipment LTE1 and LTE2 is enabled using D1 through D3 bytes, E1 byte, F1 byte and B1 byte.

In the arrangement shown in FIG. 20, in a case where the line terminated equipment LTE1 and LTE2 operate using the currently used transmission lines #1 and #2, the regenerator REG is set so as to cause a section overhead SOH to pass therethrough. When trouble occurs in the transmission line #1 or #2, the pattern PT#3 is detected from K1 and K2 bytes of a line overhead LOH in the step ST13 shown in FIG. 22 and thereby the regenerator REG causes a section overhead SOH to be terminated therein. Thereby, information transfer between the regenerator REG and the line terminated equipment LTE1 and LTE2 is enabled using D1 through D3 bytes, E1 byte, F1 byte and B1 byte.

A fourth embodiment of the present invention will now be described. The fourth embodiment relates to a case where a regenerator is used and thus a path switch ring is formed.

Figure 24:
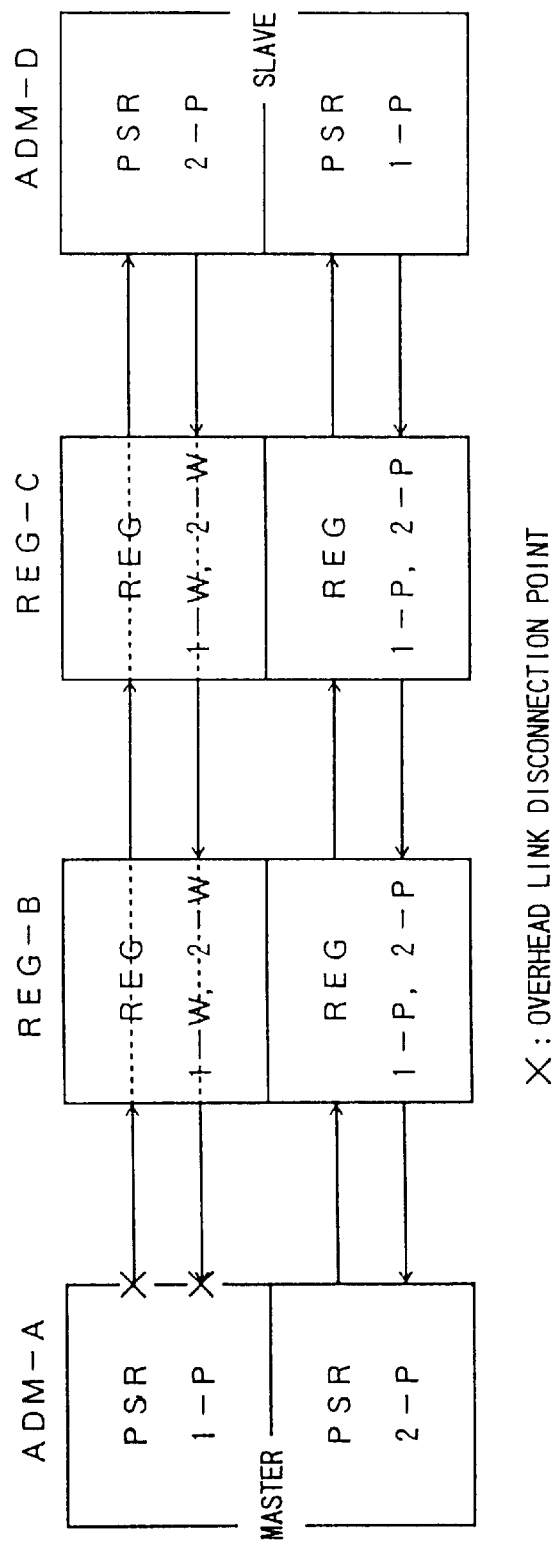
FIG. 24 shows a block diagram of an example of a path switch ring arrangement.

FIG. 24 shows a block diagram of an example of a path switch ring (PSR) arrangement. In this arrangement, two regenerators REG-B and REG-C are provided between two repeating installations ADM-A and ADM-D. Each of the repeating installations may be a line terminated equipment LTE. Each of the regenerators REG-B and REG-C accommodates two both-way transmission circuits. In each of the regenerators REG-B and REG-C, a section overhead SOH terminates only one circuit of the two both-way transmission circuits and is made to pass through the other circuit of the two both-way transmission circuits. In FIG. 24, the pass through is expressed by 1-W and 2-W, and termination is expressed by 1-P and 2-P. Further, in order to prevent generated data from returning to itself, a 1-P side of the repeating installation ADM-A is set to be a master and an overhead data link is previously disconnected (indicated by 'x' in FIG. 24). A 1-P side of the repeating installation ADM-D is set to be a slave. That is, a section overhead SOH is terminated in each of the regenerators REG-B and REG-C.

Figure 25:
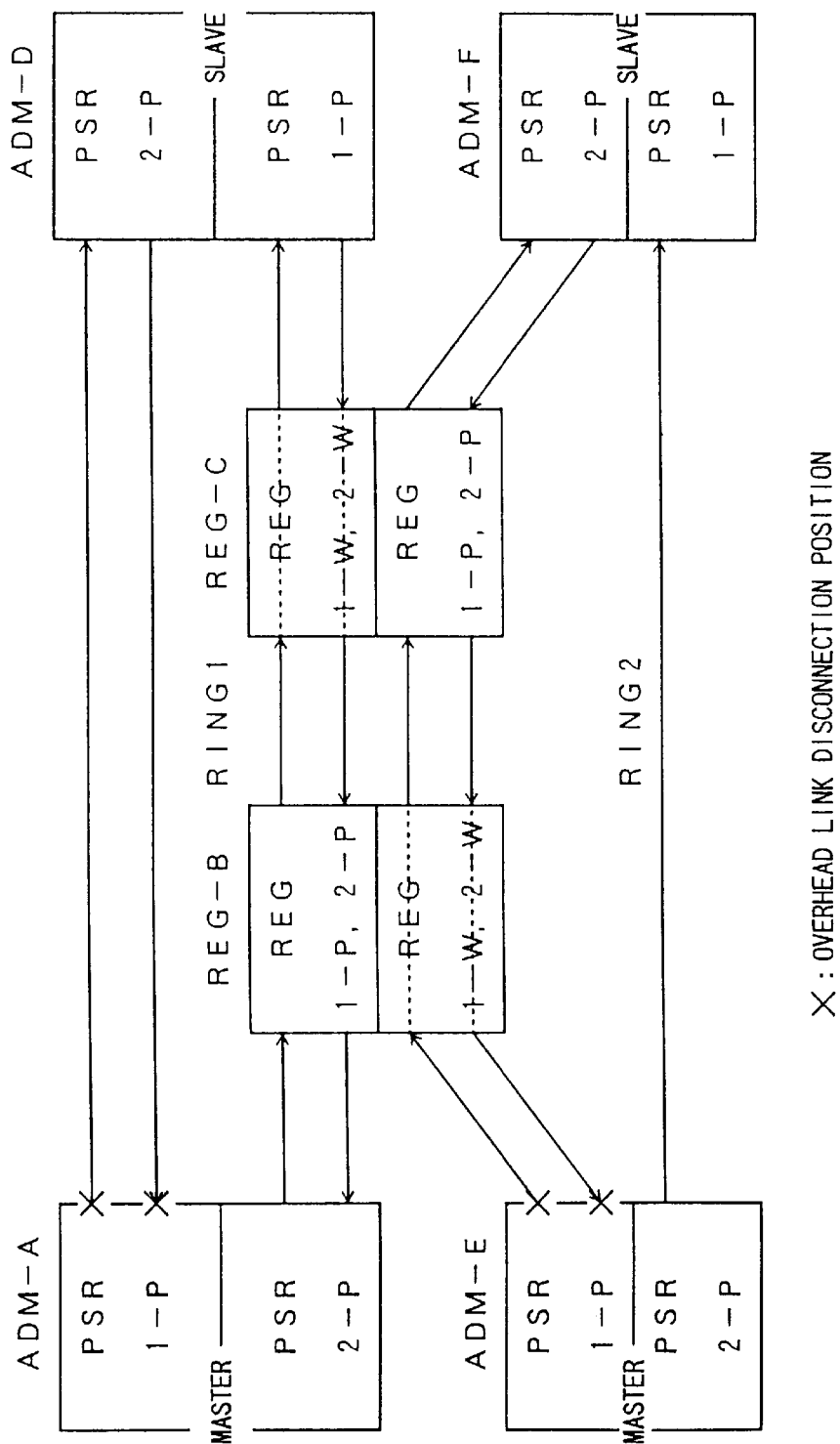
FIG. 25 shows a block diagram of another example of a path switch ring arrangement.

FIG. 25 shows a block diagram of another example of the path switch ring arrangement. The repeating installations ADM-A and ADM-D are directly connected through a transmission circuit and are connected via the regenerators REG-B and REG-C through the other transmission circuit. Further, repeating installations ADM-E and ADM-F are directly connected through a transmission circuit and are connected via the regenerators REG-B and REG-C through the other transmission circuit. Thereby, as shown in FIG. 25, two rings RING1 and RING2 are formed. Overhead links are previously disconnected (indicated by 'x' in FIG. 25) at a 1-P side of the repeating installation ADM-A and a 1-P side of the repeating installation ADM-E.

In the path switch ring arrangements shown in FIGS. 24 and 25, if trouble occurs, equipment which detects the trouble disconnects a side overhead link in which the trouble occurs, and an F1 byte (see FIG. 15) in a section overhead SOH is used as a trouble reporting signal to cause a disconnected position in the master side to be restored.

Figure 26:
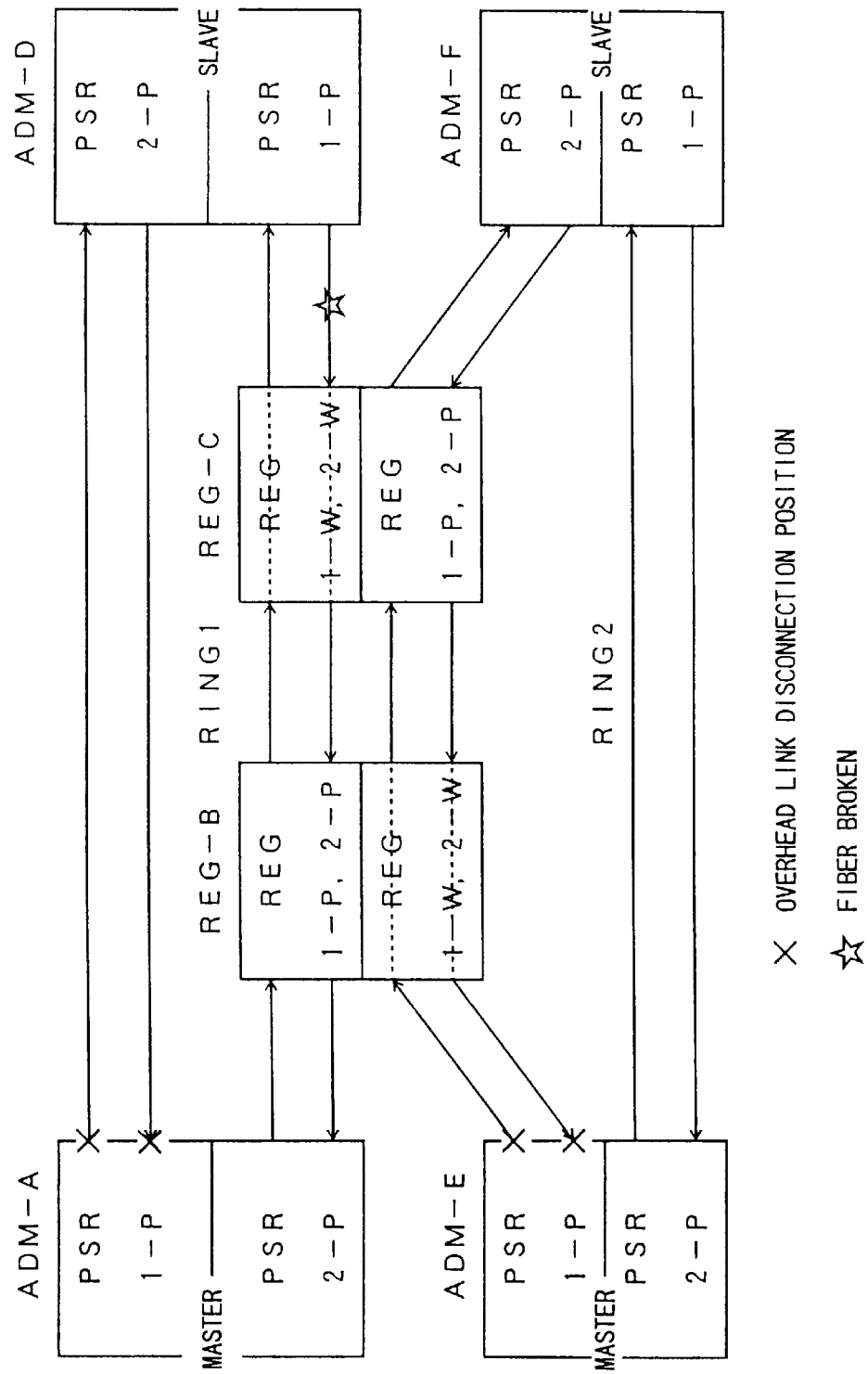
FIG. 26 illustrates a case where a transmission line of a transmission circuit which a regenerator REG-C accommodates is broken at a position indicated by a star.

In the arrangement shown in FIG. 25, a case where, as shown in FIG. 26, a transmission line in a transmission circuit in which the regenerators REG-B and REG-C are inserted is broken at a position indicated by a star is considered. In this case, input of the regenerator REG-C is broken. However, because the regenerator REG-C is set so as to cause a section overhead SOH to pass therethrough for this transmission circuit, the regenerator REG-C cannot transmit trouble information to the repeating installation ADM-A via the regenerator REG-B using the section overhead SOH. Therefore, the repeating installation ADM-D is isolated.

Figure 27:
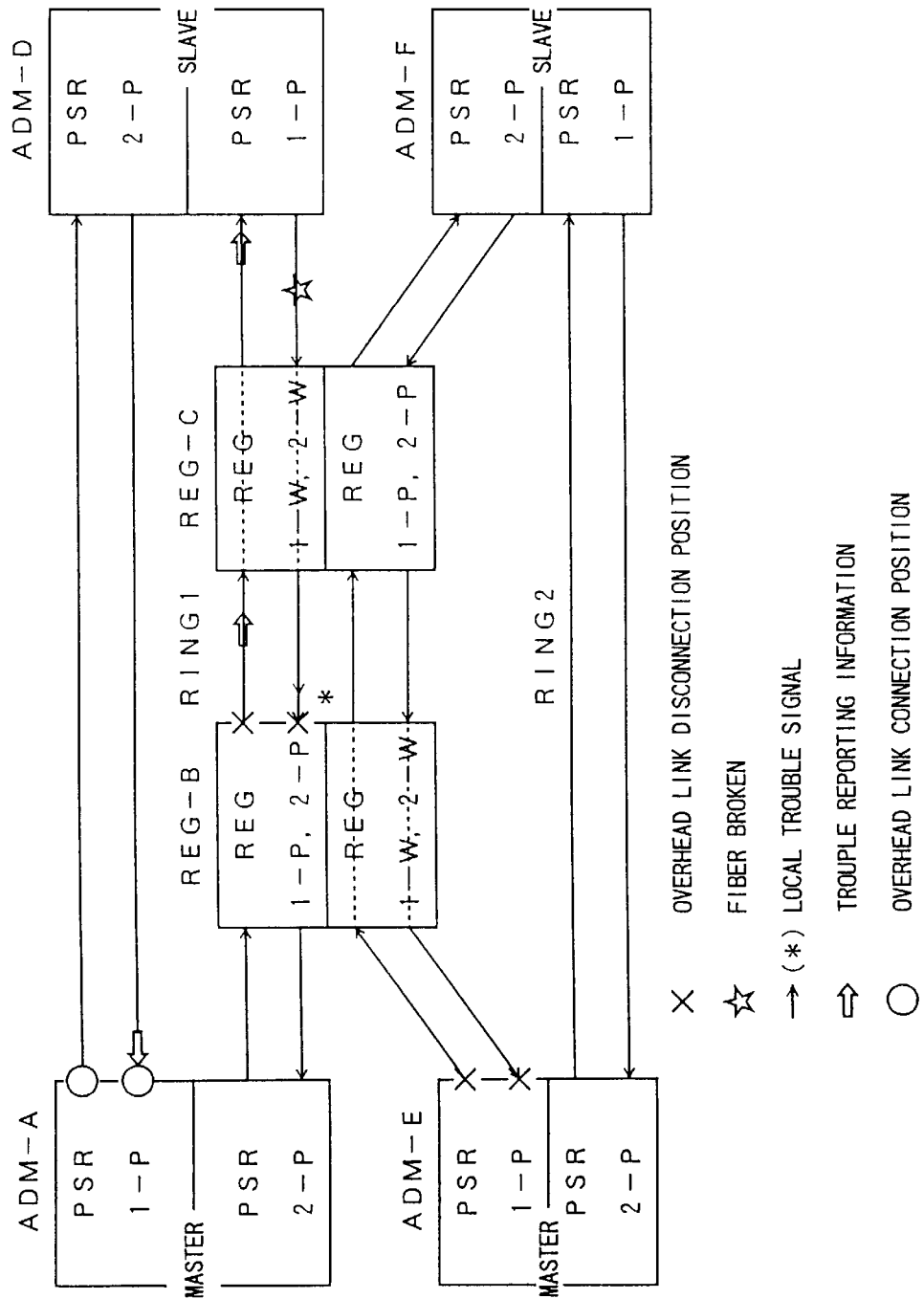
FIGS. 27 and 28 illustrate re-routing procedures according to a fourth embodiment of the present invention.

The fourth embodiment of the present invention has an object to solve this problem. FIG. 27 shows a re-routing procedure according to the fourth embodiment of the present invention. According to the re-routing procedure, the regenerator REG which causes a section overhead SOH to pass therethrough sends local trouble information to equipment which is connected with this regenerator REG and terminates the section overhead SOH. This equipment which terminates the section overhead SOH detects the local trouble information and performs disconnection of an overhead data link having a broken transmission line having trouble occurring thereon and generation of a trouble reporting signal.

If, in FIG. 27, a broken transmission line trouble occurs at the same position as that in FIG. 26, the regenerator REG-C which causes a section overhead SOH of a transmission circuit containing this transmission line to pass therethrough reports locally to the adjacent regenerator REG-B that input is broken (in an arrow indicated by *). The regenerator REG-B detects this report and performs disconnection (at a position indicated by 'x') of an overhead data link having a broken transmission line trouble occurring thereon and generation of a trouble reporting signal (F1 byte).

The regenerator REG-C causes a section overhead SOH of the transmission circuit having the trouble occurring therein to pass therethrough. Therefore, the subsequent regenerator REG-B detects above-described local trouble information by recognizing a pattern which is automatically sent out. Thereby, the regenerator REG-B detects the input trouble of the regenerator REG-C. When the input trouble occurs in the regenerator REG-C, the regenerator REG-C outputs a line alarm indication signal (LAIS). At this time, because the section overhead SOH cannot be defined, the section overhead SOH represents all '0' information. As a result, the F1 byte therein also represents '0'.

The above-described block 35e shown in FIG. 11 generates the line alarm indication signal LAIS. The block 35e generates the signal LAIS if no data is output by the memory 35c for a predetermined time period.

Figure 28:
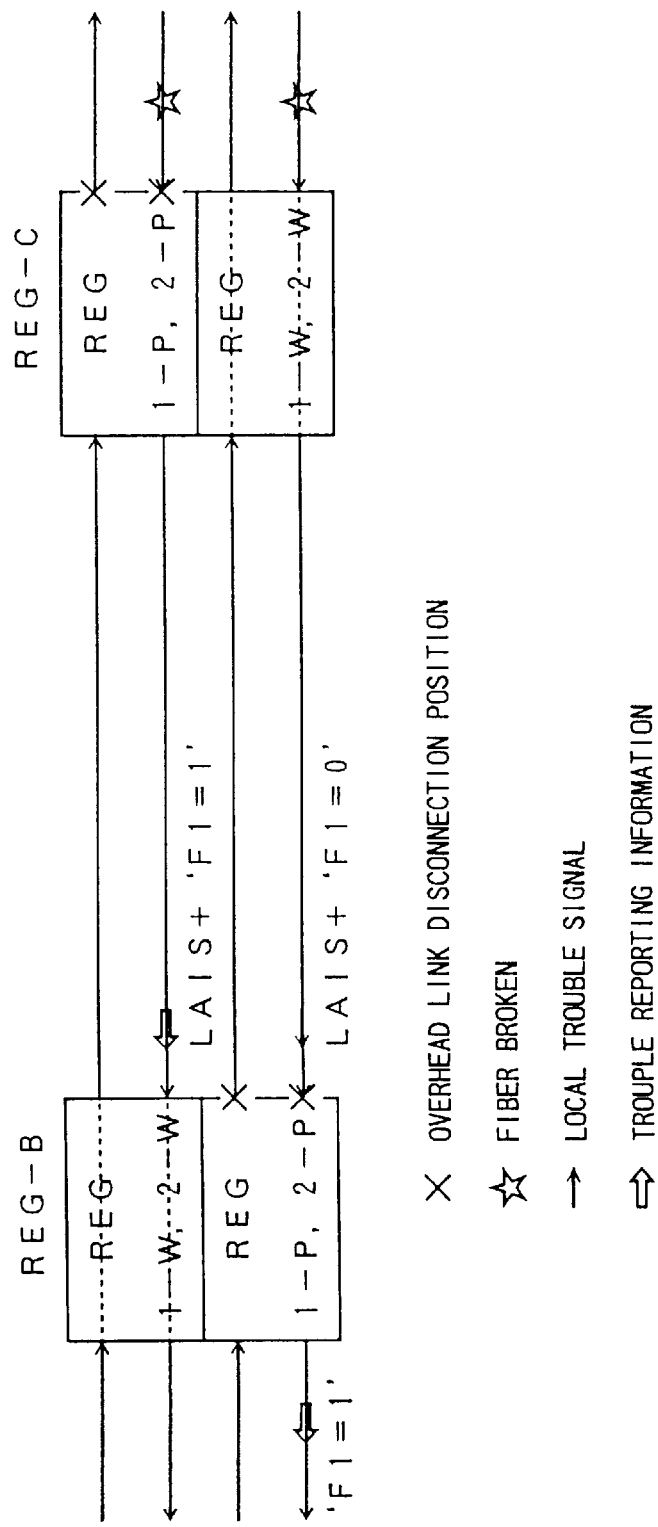

By the above-described arrangement, as shown in FIG. 28, the regenerator REG-B, which terminates the section overhead SOH having passed through the regenerator REG-C, detects the LAIS signal and 'F1=0' information (indicating that there is no trouble reporting information). When having detected them, the regenerator REG-B performs overhead data link disconnection and trouble reporting signal (F1=1) generation.

As shown in FIG. 27, the trouble reporting signal generated by the regenerator REG-B passes through the regenerator REG-C to the repeating installation ADM-D which then sends the same signal to the repeating installation ADM-A. The repeating installation ADM-A detects that F1=1 and thereby connects or restores (at a position indicated by 'o' in FIG. 27) an overhead data link which has been disconnected (at a position indicated by 'x' in FIG. 26) by this time.

Further, in FIG. 28, a case is also indicated, where a transmission line in a transmission circuit, which the regenerator REG-C terminates, is broken and as a result an input trouble occurs in the regenerator REG-C. In this case, the regenerator REG-C detects this input trouble and performs overhead data link disconnection (at a position indicated by 'x') and sets '1' in the trouble reporting signal F1 (F1=1). This trouble reporting signal is sent out together with a LAIS signal such as that mentioned above from the regenerator REG-C, passes through the regenerator REG-B and then is sent to the subsequent repeating installation ADM-E shown in FIG. 27.

Figure 29:
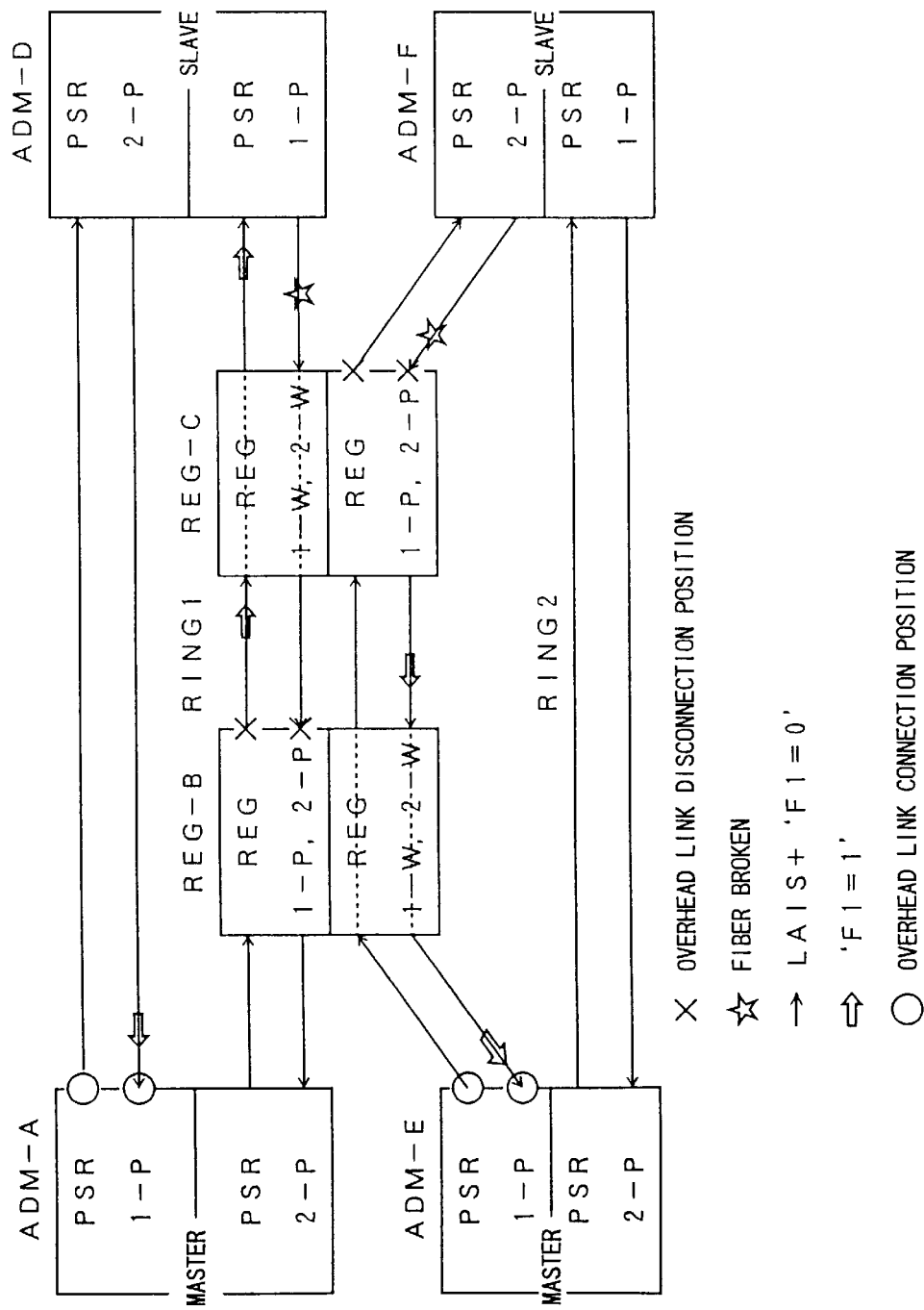
FIG. 29 illustrates a re-routing procedure for a case where, in addition to the trouble shown in FIG. 27, input trouble occurs in the regenerator REG-C due to trouble occurring in a transmission circuit, the regenerator REG-C terminating a section overhead SOH of the transmission circuit.

FIG. 23 illustrates a re-routing procedure for a case where, in addition to the broken transmission line trouble described with reference to FIG. 27, a broken transmission line trouble occurs in a transmission circuit, a section overhead SOH of the transmission circuit being terminated by the regenerator REG-C, and thereby an input trouble occurs in the regenerator REG-C. When the input trouble occurs in the regenerator REG-C, the regenerator REG-C disconnects an overhead data link (at a position indicated by 'x') and sets '1' in a trouble reporting signal F1 (F1=1). This trouble reporting signal passes through the regenerator REG-B together with a LAIS signal and is sent to the repeating installation ADM-E. The repeating installation ADM-E detects that F1=1 and thereby connects or restores (at a position indicated by 'o' in FIG. 29) an overhead data link which has been disconnected (at a position indicated by 'x' in FIG. 27) by this time.

The connection (restoration) and disconnection of an overhead data link are achieved as a result of, for example, controlling the high impedance control units 21, 21A shown in FIG. 9.

A fifth embodiment of the present invention will now be described.

In an arrangement shown in FIG. 10, the frame synchronization circuit 33 establishes frame synchronization of a parallel-form signal using an internal byte switch. For example, when data D1 through D8 of 8 bits is output by serial-parallel converter 32 in a case where the top data of this one byte should be D0 correctly, the frame synchronization circuit 33 performs a frame synchronization operation and outputs parallel data D0 through D7 of 8 bits. Ordinarily, as shown in FIG. 10, the byte switch forming the frame synchronization circuit is only provided at a reception side and is not provided at a transmission side. However, when the byte switch is provided only at the reception side, considerable time is required for restoration of synchronization (signal restoration) in a total system after recovery from an occurrence of trouble. This problem will now be described with reference to FIGS. 30A and 30B.

Figures 30A, 30B:
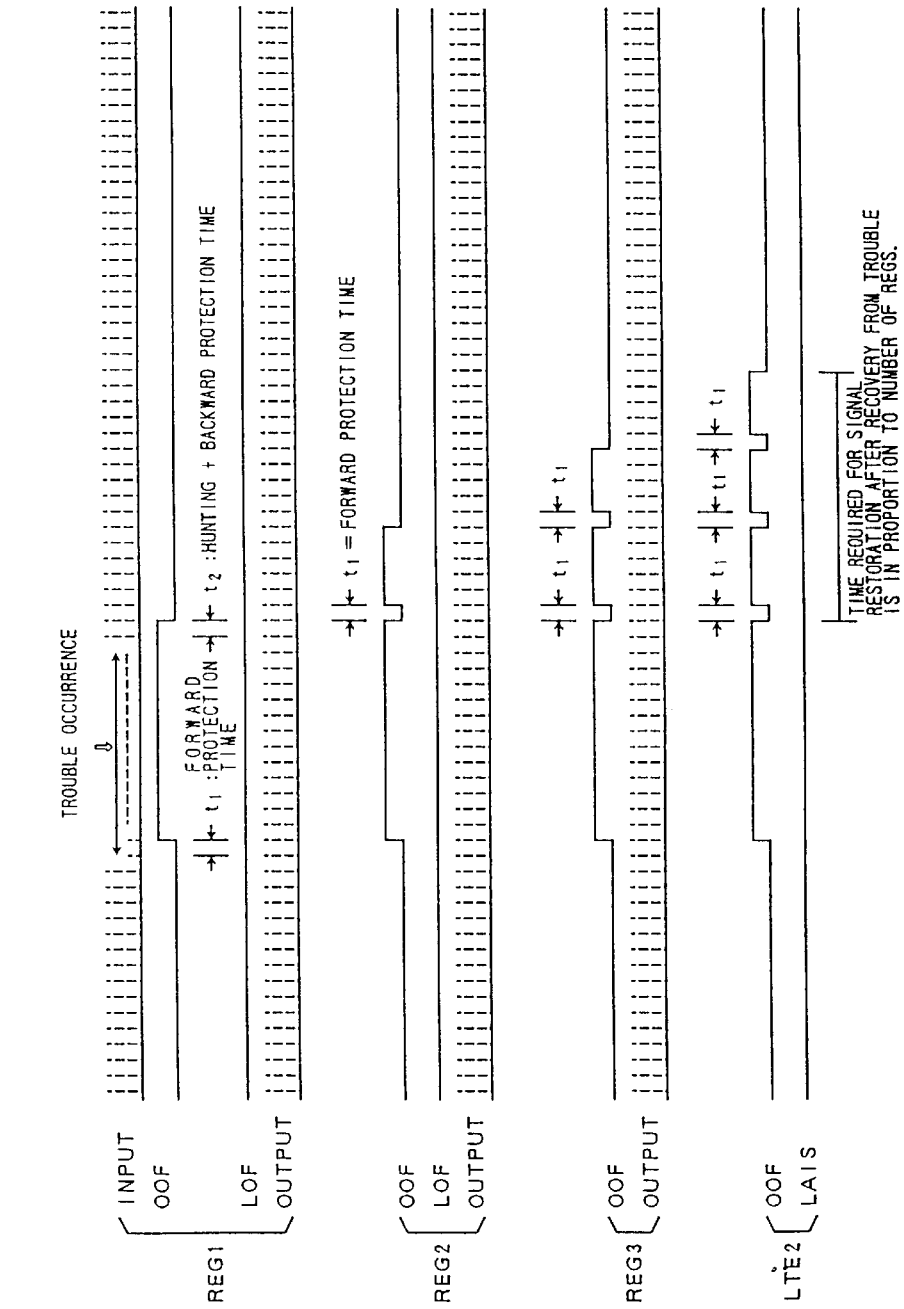
FIGS. 30A and 30B illustrate an arrangement in the related art concerning an out of frame-synchronization state and restoration therefrom.

A multiplex transmission system shown in FIG. 30A is considered. This system is provided with three regenerators REG1, REG2 and REG3 between two line terminated equipment LTE1 and LTE2. Each regenerator has a byte switch at a transmission side. FIG. 30B shows timing charts illustrating operation timing of the regenerators REG1, REG2 and REG3, and line terminated equipment LTE2. In FIG. 30B, 'OOF' represents 'out of frame' (out of synchronization), and 'LOF' represents 'loss of signal'. 'LAIS' is the above-described line alarm indication signal. A repeating section and a multiplex section will now be described with reference to FIG. 30A. A repeating section means a section between regenerators and a section between a regenerator and a line terminated equipment. A multiplex section means a section between the line terminated equipment LTE1 and LTE2.

If a trouble occurs in a position indicated by 'x' in FIG. 30A, the regenerator REG1 goes out of frame synchronization after a forward protection time $t_1$ elapses. Similarly, the other regenerators REG2, REG3 and line terminated equipment LTE2 go out of frame synchronization at the same time. After recovery from the trouble, frame synchronization is re-established in the regenerator REG1 after lapse of a sum $t_2$ of a time required for synchronization hunting and backward protection time. However, a position of a frame output by the regenerator REG1 changes every synchronization hunting by the regenerator REG1. As a result, in the subsequent regenerators REG2, REG3 and line terminated equipment LTE2, due to the change of a position of a frame output by the regenerator REG1, although once synchronization is hunted, the synchronization is out again. Thus, a longer time is required for signal restoration as a number of regenerators connected forward. That is, the time required for signal restoration is in proportion to the number of regenerators connected forward. When the frame synchronization circuit of the regenerator REG receives the parallel data D1 through D8 and outputs the data D0 through D7 in the above-described example, the frame synchronization circuit of another regenerator operates similarly. However, in a case where, for example, the frame synchronization circuit of the regenerator REG1 receives the parallel data D3 through D10 and outputs the data D0 through D7 when the recovery is achieved from the trouble, another regenerator cannot immediately follow thereto.

Figure 31:
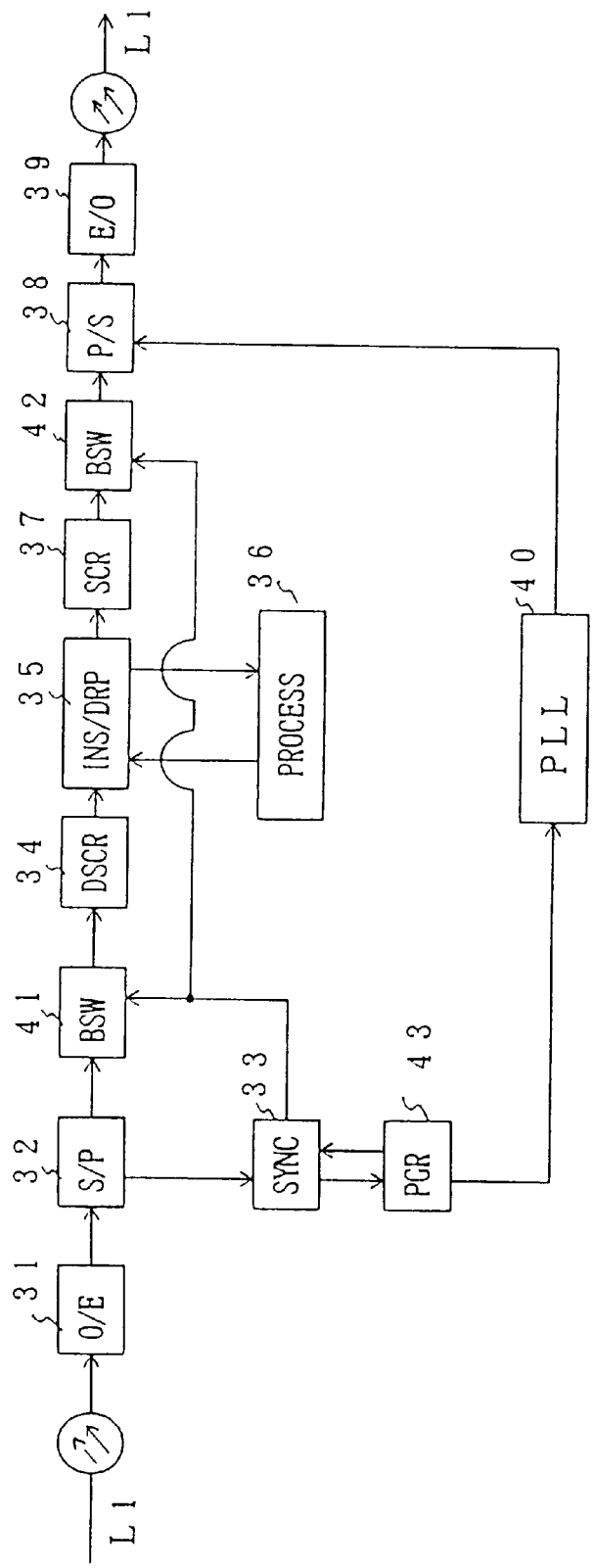
FIG. 31 shows an arrangement of a regenerator according to a fifth embodiment of the present invention.

In order to solve this problem, in the fifth embodiment of the present invention, a regenerator REG is arranged as shown in FIG. 31. In FIG. 31, the same reference numerals are given to components identical to those shown in FIG. 10. In FIG. 31, the frame synchronization circuit 33 shown in FIG. 10 is indicated in a manner in which the byte switch (BSW) 41 contained in the frame synchronization circuit 33 and the other part are separately indicated. Further, a reception-side timing signal generator (PGR) which is omitted in FIG. 10 is indicated in FIG. 31.

Features in the arrangement shown in FIG. 31 are that a byte switch (BSW) 42 is provided also at a transmission side and is controlled through the frame synchronization circuit 33 together with control of the reception-side byte switch (BSW) 41 in the same timing, thus the two byte switches 41 and 42 operate together. Thereby, in a normal condition, a switch state of the switch 41 agrees with a switch state of the switch 42. For example, in a case where the byte switch 41 receives parallel data D1 through D8 and outputs D0 through D7, the byte switch 42 receives parallel data D0 through D7 and outputs D1 through D8. Thereby, between the reception side and transmission side, frame positions agree with each other at the same timing. Accordingly, in each of the subsequent regenerators REG, frame positions can be determined at the same timing between a reception side and transmission side and a frame position does not change.

FIGS. 32A and 32B illustrate operation in a case where each regenerator REG has the arrangement shown in FIG. 31 and a similar trouble occurs. As shown in FIG. 32B, all the regenerator REG1, REG2, REG3 and line terminated equipment LTE2 operates in the same timing and can achieve signal restoration at the same time. In other words, in this case, different from the case shown in FIG. 30B, a time required for the signal restoration does not depend on the number of forward regenerators.

The embodiments have been described above. However, the present invention is not limited to the above-described embodiments, and variations and modifications may be made without departing from the scope of the present invention. For example, it is possible to appropriately combine above-described embodiments.

What is claimed is:

1. A repeating installation in a communication system having two transmission paths, each of said two transmission paths transmitting a multiplexed signal both ways, said repeating installation comprising:

selecting means for selecting one of said two transmission paths;

terminating means for terminating management information contained in a signal which passes through the transmission path selected by said selecting means; and a bypass circuit for enabling a main signal to bypass said terminating means.

2. The repeating installation according to claim 1, further comprising setting means for setting a non-selected transmission path to be in a high impedance state.

3. The repeating installation according to claim 1, wherein:

said selecting means and terminating means are commonly provided for said two transmission paths; and said repeating installation further comprises extracting and outputting means for extracting the management information transmitted and outputting the management information to be outputted.

4. The repeating installation according to claim 1, wherein the management information comprises a section overhead including management information with regard to a repeating section of said communications system.

5. The repeating installation according to claim 1, wherein:

the management information comprises a section overhead including management information with regard to a repeating section of said communications system; and said terminating means is inoperative to terminate management information with regard to a multiplex section.

6. The repeating installation according to claim 1, wherein one of said two transmission paths comprises a spare transmission path.

7. The repeating installation according to claim 1, wherein said selecting means comprises means which refers to predetermined information contained in a signal which passes through the selected transmission path and selects one of said two transmission paths.

8. The repeating installation according to claim 7, further comprising means which terminates management information for managing a multiplex section of said communications system and obtains the predetermined information.

9. The repeating installation according to claim 8, wherein the predetermined information contained in the management information comprises information indicating that the transmission circuit is switched over from a currently used transmission path to a spare transmission path due to occurrence of trouble.

10. A repeating installation in a communications system having at least one transmission path which transmits a multiplexed signal both ways, comprising:

determining means for determining whether management information contained in a signal which passes through said at least one transmission path with regard to a repeating section of said communications system is terminated; and terminating means for terminating management information with regard to a multiplex section of said communications system;

wherein said determining means performs determination based on the management information terminated by said terminating means; and a bypass circuit for enabling a main signal to bypass said terminating means.

11. The repeating installation according to claim 10, wherein said determining means obtains a pattern from the management information and thereby performs the determination.

12. The repeating installation according to claim 11, wherein:

said communications system comprises a spare transmission path; and the pattern of the management information depends-on a switching-over operation in which the transmission path is switched over to said spare transmission path due to occurrence of trouble.

13. A repeating installation in a communications system having at least one transmission path which transmits a multiplexed signal both ways, comprising:

a first frame synchronization switch provided at a reception side; and a second frame synchronization switch provided at a transmission side;

wherein said first and second synchronization switches operate together and are always in identical states; and a bypass circuit for enabling a main signal to bypass a terminating means that terminates management information.

* * * * *